(12) United States Patent
Borrett et al.

(10) Patent No.: US 9,362,754 B2
(45) Date of Patent: *Jun. 7, 2016

(54) ENERGY CONSUMPTION MANAGEMENT

(71) Applicant: Reactive Technologies Limited, Oxford (GB)

(72) Inventors: Marc Borrett, Poole (GB); Heikki Huomo, Oulu (FI)

(73) Assignee: REACTIVE TECHNOLOGIES LIMITED, Oxford (GB)

(\*) Notice: Subject to any disclaimer, the term of this patent is extended or adjusted under 35 U.S.C. 154(b) by 0 days.

This patent is subject to a terminal disclaimer.

(21) Appl. No.: 14/338,787

(22) Filed: Jul. 23, 2014

(65) Prior Publication Data

US 2014/0336836 A1    Nov. 13, 2014

Related U.S. Application Data

(63) Continuation of application No. 13/427,970, filed on Mar. 23, 2012, now Pat. No. 8,825,217.

(30) Foreign Application Priority Data

Mar. 24, 2011   (GB) .................................. 1104986.3

(51) Int. Cl.
*H02J 4/00*         (2006.01)
*G06Q 10/06*        (2012.01)
(Continued)

(52) U.S. Cl.
CPC . *H02J 4/00* (2013.01); *G06Q 10/06* (2013.01); *G06Q 50/06* (2013.01); *H02J 3/14* (2013.01);
(Continued)

(58) Field of Classification Search
None
See application file for complete search history.

(56) References Cited

U.S. PATENT DOCUMENTS

| 3,906,242 | A | 9/1975 | Stevenson |
| 8,825,217 | B2 * | 9/2014 | Borrett ............... G06Q 10/06 700/295 |

(Continued)

FOREIGN PATENT DOCUMENTS

| CN | 101752093 A | 6/2010 |
| CN | 101950962 A | 1/2011 |

(Continued)

OTHER PUBLICATIONS

European Search Report dated Jul. 17, 2012 issued from the European Patent Office in counterpart European Application No. 12161124.8 (3 pages).

(Continued)

*Primary Examiner* — Ryan Jarrett
(74) *Attorney, Agent, or Firm* — EIP US LLP

(57) ABSTRACT

Methods, systems, and devices for controlling electrical energy consumption in an electricity distribution network, so as to reduce net energy consumption in a given area during a given time period are described. In particular, a method of controlling electrical energy consumption within an electricity distribution network is described. The method comprises maintaining a database of information about electric devices, and identifying an area in which, and a time period during which, electrical energy consumption is to be controlled. The method further comprises selecting, based on device information stored in the database, groups of electric devices, and associating one or more time intervals with each of the selected groups. Requests are sent to the electric devices of the selected groups to control electrical energy consumption and/or provision by the electric devices. This enables a reduction in net consumption of electrical energy in a given area, during a respective time interval.

36 Claims, 17 Drawing Sheets

(51) Int. Cl.
*G06Q 50/06* (2012.01)
*H02J 3/14* (2006.01)

(52) U.S. Cl.
CPC .......... *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | |
|---|---|---|
| 2004/0024494 A1 | 2/2004 | Bayoumi et al. |
| 2004/0027004 A1 | 2/2004 | Bayoumi et al. |
| 2004/0030457 A1 | 2/2004 | Bayoumi et al. |
| 2004/0046455 A1 | 3/2004 | Murguia |
| 2004/0133529 A1 | 7/2004 | Munster |
| 2006/0207269 A1 | 9/2006 | Jung et al. |
| 2007/0213880 A1 | 9/2007 | Ehlers |
| 2008/0177423 A1 | 7/2008 | Brickfield et al. |
| 2009/0043519 A1 | 2/2009 | Bridges et al. |
| 2009/0062970 A1 | 3/2009 | Forbes et al. |
| 2010/0052421 A1 | 3/2010 | Schindler et al. |
| 2010/0125376 A1 | 5/2010 | Flohr |
| 2011/0258018 A1 | 10/2011 | Tyagi et al. |
| 2012/0136496 A1 | 5/2012 | Black et al. |
| 2012/0217803 A1 | 8/2012 | Talkin et al. |

FOREIGN PATENT DOCUMENTS

| | | |
|---|---|---|
| DE | 10226755 A1 | 5/2004 |
| EP | 2159749 A1 | 3/2010 |
| GB | 526881 | 9/1940 |
| JP | 11069616 A | 9/1999 |
| JP | 2001251760 A | 9/2001 |
| JP | 2002010532 A | 1/2002 |
| JP | 2008067473 A | 3/2008 |
| JP | 2009109178 A | 5/2009 |
| JP | 2010512727 A | 4/2010 |
| JP | 2010152439 A | 7/2010 |
| JP | 2010200539 A | 9/2010 |
| JP | 2010220363 A | 9/2010 |
| WO | 2010089396 A2 | 8/2010 |

OTHER PUBLICATIONS

Ep Examination Report (Article 94(3) EPC) dated Oct. 8, 2012 issued from the European Patent Office in counterpart European Application No. 12161124.8 (5 pages).

International Search Report and Written Opinion dated Jul. 24, 2012 issued from the International Searching Authority in related International Application PCT/EP2012/055355 (10 pages).

UK Search Report dated Jul. 6, 2011 issued from the Intellectual Patent Office in counterpart Application No. GB1104986.3 (4 pages).

* cited by examiner

Figure 7

| 606 → | 702 Device ID | 704 Pseudo-ID | 706 Location | 708 User defined availability | 710 Energy recovery properties | 712 Recorded statistics |
|---|---|---|---|---|---|---|
| Device 1 | | | | | | |
| Device 2 | | | | | | |
| Device 3 | | | | | | |

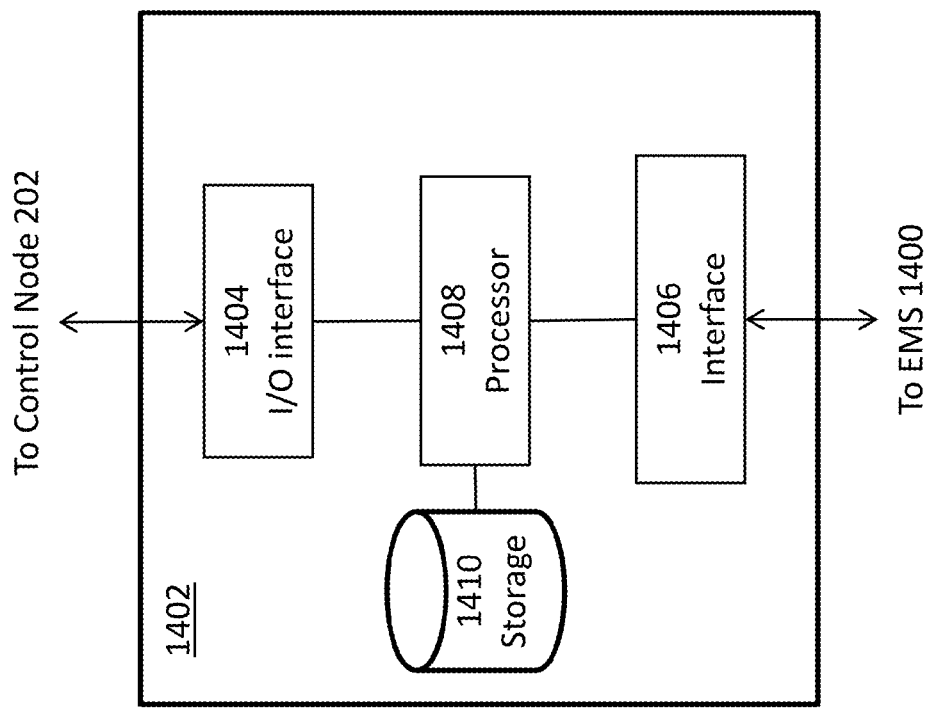

ENERGY CONSUMPTION MANAGEMENT

CROSS-REFERENCE TO RELATED APPLICATIONS

This application is a continuation application of U.S. patent application Ser. No. 13/427,970, filed on Mar. 23, 2012, which claims priority under 35 U.S.C. §119(a) to GB Patent Application No. 1104986.3, filed on Mar. 24, 2011. Each of the above-referenced patent applications is hereby incorporated by reference in its entirety.

BACKGROUND OF THE INVENTION

1. Field of the Invention

The present invention relates to management of energy consumption in an electricity distribution network. In particular, but not exclusively, it relates to management of energy consumption and provision by groups of electric devices connected to the network.

2. Description of the Related Technology

Supply of electricity from power generators such as power stations, to consumers, such as domestic households and businesses, typically takes place via an electricity distribution network. FIG. 1 shows an exemplary distribution network comprising a transmission grid 100 and a distribution grid 102. The transmission grid is connected to generating plants 104, which may be nuclear plants or gas-fired plants, for example, from which it transmits large quantities of electrical energy at very high voltages (in the UK, for example, this is typically of the order of 204 kV; however this varies by country), using power lines such as overhead power lines, to the distribution grid 102; although, for conciseness, only one distribution grid 102 is shown here, in practice a typical transmission grid supplies power to multiple distribution grids. The transmission grid 100 is linked to the distribution grid 102 via a transformer node 106, which includes a transformer 106 which converts the electric supply to a lower voltage (in the UK, for example, this is typically of the order of 50 kV; however, this varies by country) for distribution in the distribution grid 102. The distribution grid in turn links, via substations 108 comprising further transformers for converting to still lower voltages, to local networks such as a city network 112 supplying domestic users 114, and to industrial consumers such as a factory 110. Smaller power generators such as wind farms 116 may also be connected to the distribution grid 102, and provide power thereto.

The total power consumption associated with a given network varies considerably from time to time; for example, peak consumption periods may occur during the hottest part of the day during summer, when many consumers use their air conditioning units. Since it is expensive to store electricity in large quantities, it is usually generated when it is required, which can place a burden on power generators as they attempt to meet demand at peak times. Furthermore, in recent years, a greater proportion of electricity is being generated by intermittent renewable energy forms, such as solar or wind power, whose ability to generate power is dependent on environmental conditions that are difficult to predict and are beyond the control of the operator of the power generator. There may also be considerable variation in demand for electrical energy between different geographical areas; it may be difficult to supply the required amount of electric energy to areas of high demand, known as "hot spots", resulting in potential power cuts in these areas, and/or an inefficient distribution of network resources.

Accordingly, there is an increased demand for more efficient ways of managing energy consumption in electricity networks. Approaches to this problem having included providing users with pricing and other information, with the user being required to monitor an energy tariff on e.g. a smart meter, and respond to price signals from an electricity supplier. However, this places considerable burden on the user performing the monitoring. Other approaches have included methods of remotely monitoring electricity consumption devices in the network at a central location, and sending commands to disable the devices during times of high demand. However, this approach can cause considerable inconvenience to users, who may be unable to use their devices for extended periods of time.

It is an object of the present invention to at least mitigate some of the problems of the prior art.

SUMMARY

In accordance with a first embodiment of the present invention, there is provided a method of controlling electrical energy consumption within an electricity distribution network, the electricity distribution network supplying electrical energy to a geographical area, a plurality of electric devices being distributed within said geographical area, wherein each of the electric devices is connectable to the electricity distribution network to consume electrical energy provided therefrom, thereby increasing a net amount of electrical energy consumption in said geographical area, and/or to provide electrical energy to the electricity distribution network, thereby decreasing a net amount of electric energy consumption in said geographical area, the method comprising: maintaining a device database comprising profile information relating to said electric devices in said geographical area; identifying time period during which consumption of electrical energy supplied by the electricity distribution network is to be controlled; selecting, based on said profile information, a plurality of groups of said electric devices located within said geographical area, each said group comprising a plurality of said electric devices; associating one or more time intervals with each of the selected groups, the one or more time intervals associated with a given selected group being different to the one or more time intervals associated with the other selected groups, each said time interval being a time interval of said time period during which net electrical energy consumption of an associated group is to be controlled; sending one or more requests, for receipt at the electric devices of the selected groups, to control electrical energy consumption and/or provision by the electric devices, thereby reducing a net consumption of electrical energy in said geographical area, during a respective associated time interval.

In some embodiments, for at least one of the selected groups, the one or more requests results in a reduction of electrical energy consumption associated with said at least one group.

In some embodiments, for at least one of the selected groups, the one or more requests results in an increase of electrical energy provision associated with said at least one group.

By controlling energy consumption in different groups of electric devices at different times, a control node within a distribution network can reduce net energy consumption in the given time period. By splitting the time period into different time intervals and controlling different groups in each time interval, a net reduction in energy consumption can be achieved without causing significant inconvenience to any individual user of an electric device or to users of any group of devices. Further, by controlling different groups in each time interval, energy consumption can be shaped such that there is less variation in overall electrical energy consumed in the distribution network at different time periods. The groups, and control thereof, can be coordinated to control energy consumption patterns to an extent which would not be possible by controlling individual devices in an un-coordinated way.

In some embodiments, the method comprises reducing an amount of electric energy consumed by the electric device, in the case of an electric device arranged to consume electric energy, and increasing an amount of electric energy provided by the electric device, in the case of an electric device arranged to provide electric energy, during the associated time interval.

In some embodiments, the method comprises disconnecting electric devices arranged to consume electric energy and connecting electric devices arranged to provide electric energy during the associated time interval.

In some embodiments, the one or more selected electric devices comprises an electric energy generator, and the one or more requests result in an increase in electric energy generation by the electric energy generator.

In some embodiments, the associated one or more time intervals are arranged such that the group whose net energy consumption is reduced is varied sequentially throughout said time period.

In some embodiments the profile information for a given said electric device relates to an availability for control of the given electric device, and the allocation of the given electric device is performed on the basis of whether the given electric device is available for control during a given said time interval.

In some embodiments, the profile information comprises energy recovery information relating to an energy recovery property of at least some of said electric devices, and said selection of a plurality of groups is performed on the basis of the energy recovery information.

In some embodiments, the profile information comprises ownership information relating to at least some of said electric devices, and said selection of a plurality of groups is performed on the basis of the ownership information.

In some embodiments, the profile information comprises operating characteristic information relating to at least some of said electric devices, and said selection of a plurality of groups is performed on the basis of the operating characteristic information.

In some embodiments, the profile information comprises information relating to the device type of at least some of said electric devices, and said selection of a plurality of groups is performed on the basis of the device type information.

In some embodiments, the profile information includes an indication of whether a given electric device is arranged to consume electric energy or whether the given electric device is arranged to provide electric energy.

In some embodiments, the profile information comprises energy amount indicators indicating an amount of energy consumption and/or provision associated with the electric devices, and the method comprises: identifying a net amount of energy consumption to be reduced during said time period; and allocating electric devices to groups on the basis of the energy amount indicators.

In some embodiments, the profile information comprises location indicators indicating a location of a given electrical device, and method comprises: identifying a given area in which electrical energy consumption is to be controlled, the given area being an area of said geographical area supplied by the electricity distribution network; and selecting, based on said location indicators, a plurality of said groups of said electric devices located within said geographical area.

In some embodiments, the method comprises maintaining said device database at a control node associated with the given area.

In some embodiments, the method comprises sending one or more requests from said control node.

In some embodiments, the device database comprises device identifiers identifying electric devices located in said given area. In some embodiments, the method comprises using the device identifiers to monitor, at the control node, electric energy consumption and/or provision patterns of the electric devices, to compile statistical information relating to electric energy consumption/provision patterns associated with the electric devices; providing the statistical information to the central node to be recorded in the device database; and allocating electric devices to groups on the basis of the statistical information. By providing statistical information back to the central node for each identifiable electric device, an accurate and up-to-date statistical model of the behavior of all electric devices operating within the electrical distribution network can be maintained, thus improving the reliability, and effectiveness of decisions made by the control nodes.

In some embodiments, the control node is arranged to communicate with a central node, the central node comprising a user database, the user database identifying a user associated with each of the electric devices. The device database may be arranged to store further identifiers, different to said device identifiers, the further identifiers each identifying a corresponding electric device, the user database comprising said further identifiers. These features allow data relating to individual devices to be shared between the user database and the device database, so that e.g. changes made at the user database can be reflected in the device database, without any necessity for personal data relating to the user to be stored locally at a control node.

In some embodiments, the method comprises varying the further identifiers. This is may be done e.g. on a daily basis and provides an increased degree of anonymity for the users.

In some embodiments, the plurality of electric devices are distributed amongst a plurality of premises in said geographical area. Each of the plurality of premises may be connected to the electricity distribution network via a distribution feeder.

In some embodiments, the method comprises sending one or more said requests for receipt at electric devices via a gateway in an energy management system associated with a given said premises, said energy management system being arranged to control electrical energy consumption and/or provision by electric devices at the given premises according to defined rules for controlling devices associated with the gateway.

In some embodiments, the method comprises determining, at the gateway, whether to pass the requests to the electric device on the basis of a determination of whether the requests are compatible with the defined rules.

In some embodiments, the method comprises buffering one or more said requests for execution at one or more predetermined times.

In some embodiments, the method comprises updating the device database when one or more of the requests is not compatible with said defined rules.

In some embodiments, the method comprises: allocating electric devices to generate a plurality of models on the basis of said profile information; evaluating the plurality of models against one or more energy management criteria; determining one or more characteristics of a preferred model on the basis of said evaluation; and performing said selection of groups at least partly on the basis of the determined characteristics.

In some embodiments, the determination comprises interpolating and/or extrapolating said generated plurality of models to determine said one or more characteristics.

In some embodiments, the energy management criteria include financial data, the financial data relating to at least one of a time dependent electrical energy market value, a balancing management service and a constraint management service.

In accordance with a second embodiment of the present invention, there is provided a control node for controlling electrical energy consumption within an electricity distribution network, the electricity distribution network supplying electrical energy to a geographical area, a plurality of electric devices being distributed within said geographical area, wherein each of the electric devices is connectable to the electricity distribution network to consume electrical energy provided therefrom, thereby increasing a net amount of electrical energy consumption in said geographical area, and/or to provide electrical energy to the electricity distribution network, thereby decreasing a net amount of electric energy consumption in said geographical area, the control node comprising: a communications means, the communications means being for sending requests for receipt at the electric devices, and for communicating with a central node, the central node comprising a device database arranged to store profile information relating to each of said electric devices; input means arranged to receive an indication of a time period during which, electrical energy consumption in the electricity distribution network is to be controlled; and processing means arranged to: select, based on said profile information, a plurality of groups of said electric devices, each said group comprising a plurality of said electric devices; associate one or more time intervals with each of the selected groups, the one or more time intervals associated with a given selected group being different to the one or more time intervals associated with the other selected groups, each said time interval being a time interval of said time period during which net electrical energy consumption of an associated group is to be controlled; and send one or more requests, via the communications means, for receipt at the electric devices of the selected groups, to control electrical energy consumption and/or provision by the electric devices, thereby reducing a net consumption of electrical energy in said geographical area, during a respective associated time interval.

In accordance with a third embodiment of the present invention, there is provided a system controlling electrical energy consumption within an electricity distribution network, the electricity distribution network supplying electrical energy to a geographical area, a plurality of electric devices being distributed within said geographical area, wherein each of the electric devices is connectable to the electricity distribution network to consume electrical energy provided therefrom, thereby increasing a net amount of electrical energy consumption in said geographical area, and/or to provide electrical energy to the electricity distribution network, thereby decreasing a net amount of electric energy consumption in said geographical area, the system comprising: a plurality of control nodes, each of which is associated with a different area of the geographical area; and a said central node.

In some embodiments, the electric devices whose profile information is stored in the device database are associated with different user accounts, and the central node comprises a user interface for a said user to access a said account and to alter information stored in the device database. This feature allows users to amend desired operating characteristics of the electric devices they own in real time, so as to prevent the system restricting use of devices inconveniently.

Further features and advantages of the invention will become apparent from the following description of preferred embodiments of the invention, given by way of example only, which is made with reference to the accompanying drawings.

BRIEF DESCRIPTION OF THE DRAWINGS

FIG. 7 shows an exemplary device database in accordance with one or more embodiments of the present invention;

FIG. 14b shows an interface manager in accordance with one or more embodiments of the present invention.

DETAILED DESCRIPTION OF CERTAIN INVENTIVE EMBODIMENTS

Figure 1:
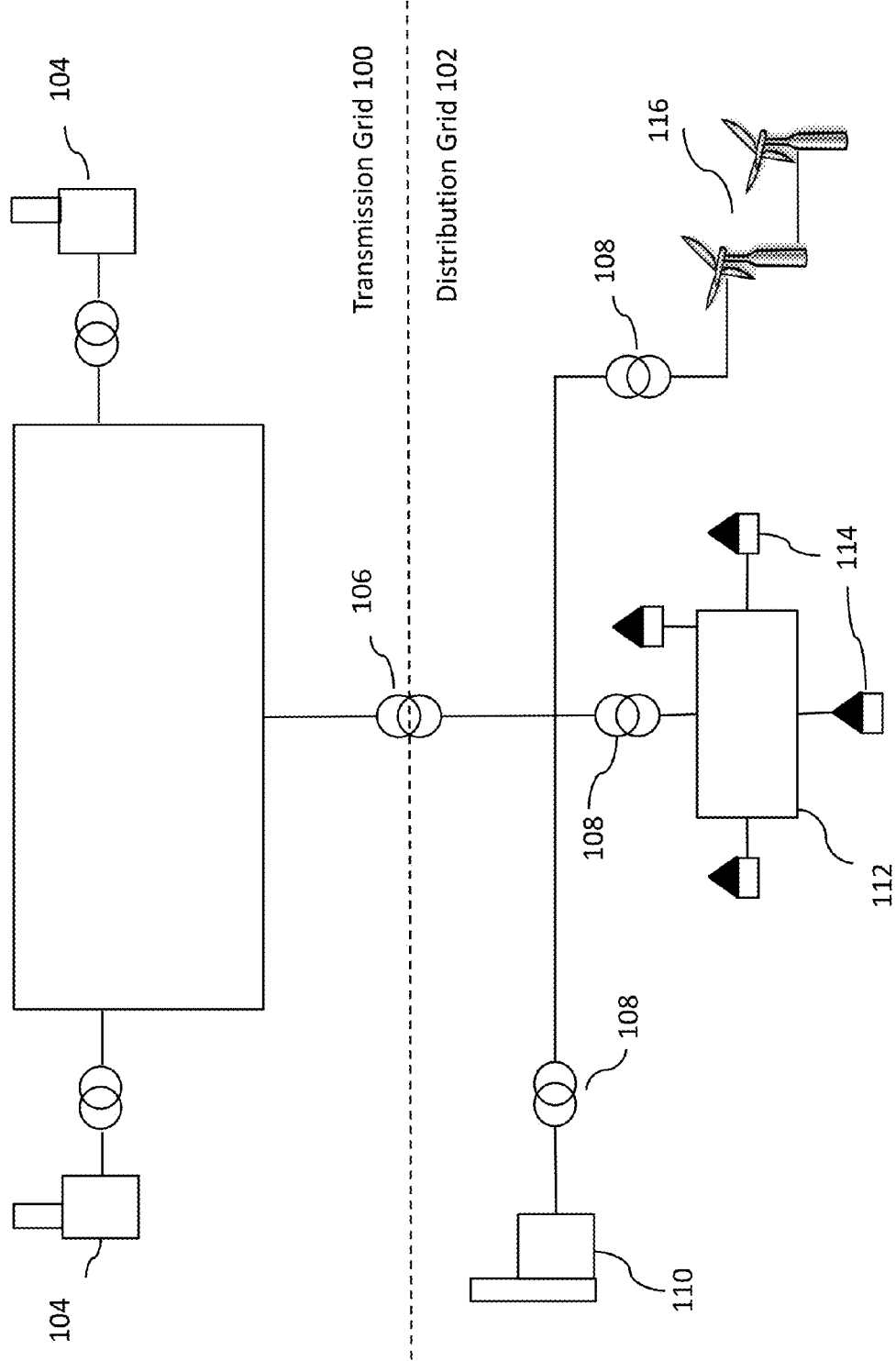
FIG. 1 shows a prior art electricity distribution network.
Figure 2:
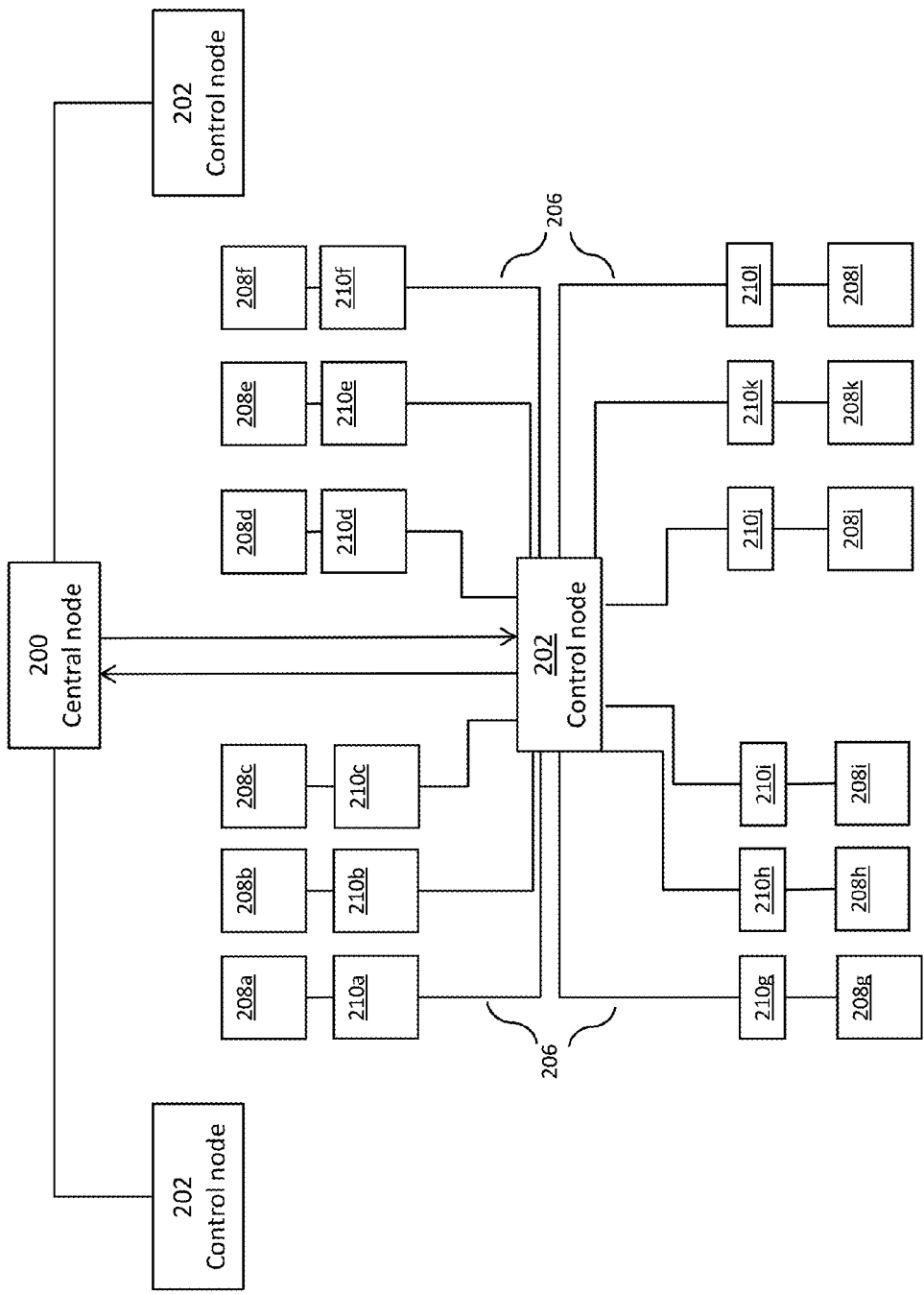
FIG. 2 shows a system comprising a central node, a plurality of control nodes and a plurality of electric devices, for implementing one or more embodiments of the present invention.

FIG. 2 illustrates an electricity distribution network in which an embodiment of the present invention may be implemented. The network comprises a central node 200 connected to one or more control nodes 202 that each cover a geographical area, for example a country, region, state, postal-code, or electricity market region, or any other area comprising multiple user premises (i.e. multiple residences or workplaces). Each of the control nodes 202 are connected by power lines 206, via substations and/or distribution feeders, to energy consumption/provision devices 208a to 208l, hereinafter referred to as electric devices 208. Each of the electric devices 208a to 208l consumes and/or provides electric energy. Examples of electric devices 208 consuming electric energy include domestic appliances such as electric water heaters, air-conditioning units and washing machines, as well as industrial devices, such as factory machinery. Examples of providers of electric energy include generators of electric energy such solar panels and wind-turbines, and electricity storage devices such as batteries. Still other electric devices 208 may consume electric energy at some times but provide it at others, such as personal electric vehicles (PEVs); PEVs typically have the capacity to store a large amount of electricity, and may be connected to the electricity network when they are stationary, allowing them to be used as a source of power for the network at times of high demand, with electricity stored in the battery of the PEV being fed back to the network at such times.

The term "electric device" is used herein to include individual appliances or devices, as well as collections of such appliances and devices, such as a particular business premises or house. Each electric device 208a to 208l is registered to a control scheme, in which the owner of the device gives permission to the control scheme operator to control energy transfer to/from the electric device 208a to 208l.

Although, for the sake of simplicity, only twelve electric devices 208a to 208l are shown in FIG. 2, it will be understood that, in practice, the network will typically comprise many hundreds or thousands of such devices.

Figure 3:
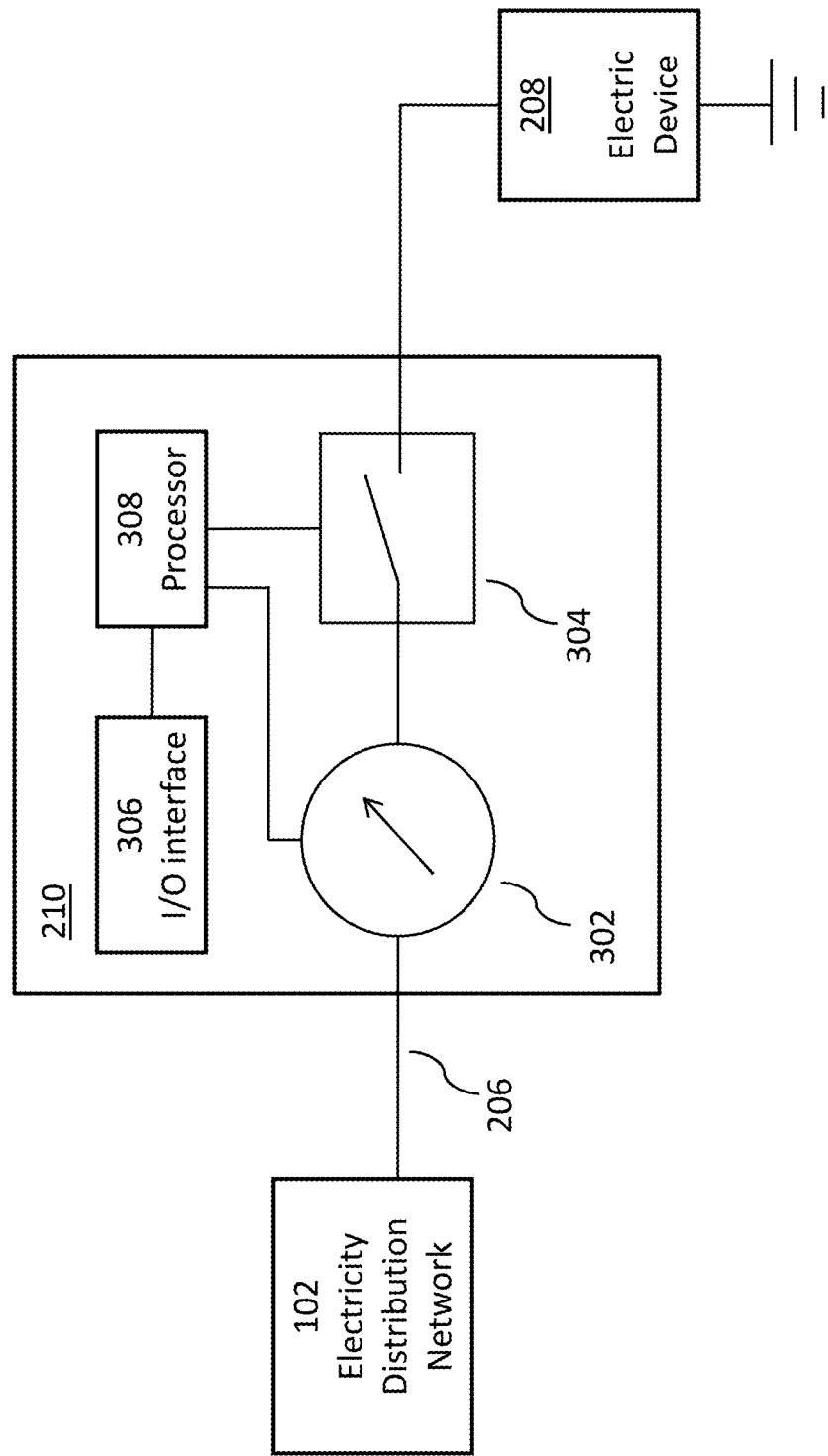
FIG. 3 shows an exemplary electric device and an electric device control unit in accordance with one or more embodiments of the present invention.

Each registered electric device 208a to 208l has an associated electric device control unit 210a to 210l which controls transfer (i.e. provision and/or consumption) of energy to/from the electric device 208a to 208l. FIG. 3 shows an exemplary arrangement of an electric device 208 and an electric device control unit 210. The electric device control unit 210 includes a control element 304 for reducing/increasing the energy consumption/provision of the electric device 208 to/from the electricity distribution network 102, as well as a measuring device in the form of a smart meter 302. The control element 304 may comprise a switch for connecting/disconnecting the electric device 208 to/from the electricity distribution network 102 and/or any electrical or electronic means allowing functional set points of an electric device 208 to alter the electrical consumption/provision by the electric device 208 (for example, a thermostat or humidity sensor, illumination sensor, pressure sensor and infra-red sensor etc.). The electric device control unit 210 is arranged to receive instructions from, and send meter measurements to, the control node 202 via a communications interface 306. The electric device control unit 210 comprises a processor 308 arranged to control the functions of the smart meter 302, the control element 304, and the communications interface 306. Although, the electric device control unit 210 is here shown as a separate device to the electric devices 208, in some embodiments, the electric device control units 210 are integral to the electric devices 208.

Figure 4:
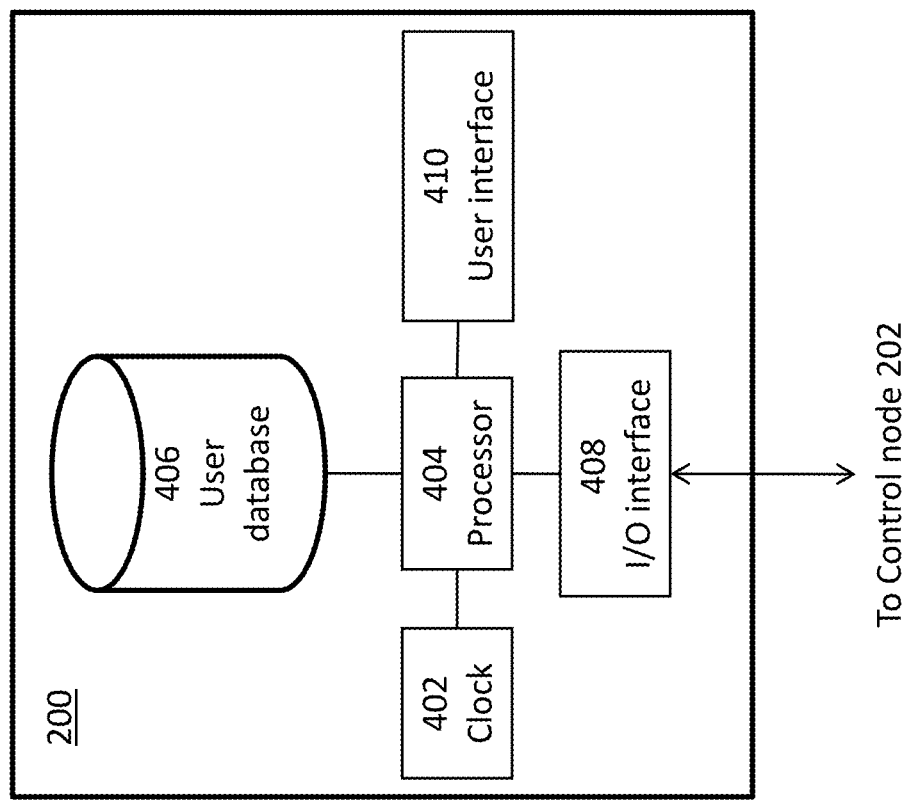
FIG. 4 shows an exemplary central node in accordance with one or more embodiments of the present invention.

Exemplary components of a central node 200 are shown in FIG. 4. The central node 200 comprises a clock 402, a processing means in the form of a processor 404, a user database 406, a communications means in the form of a communications interface 408, and an input means in the form of a user interface 410.

Figure 5:
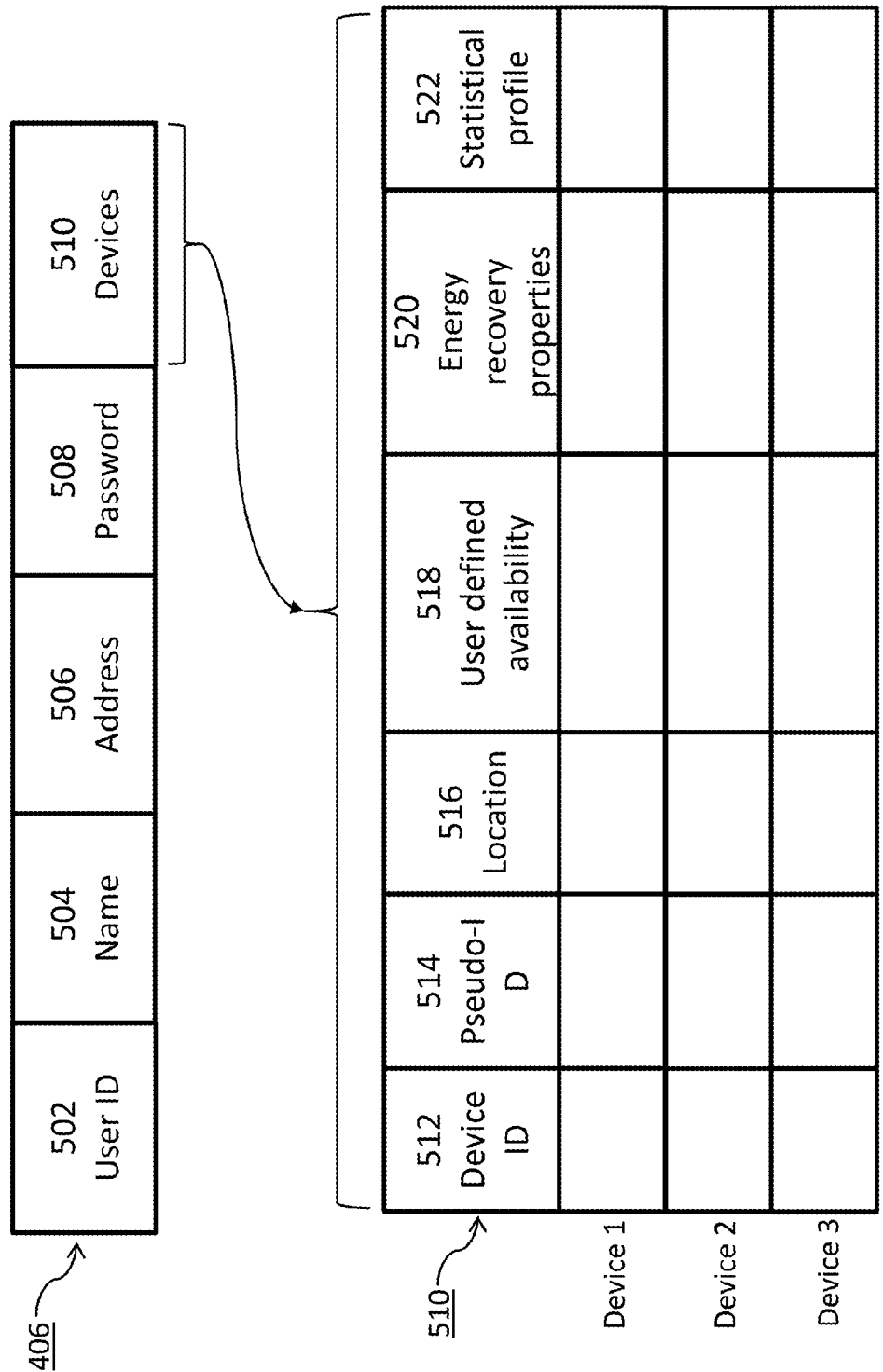
FIG. 5 shows an exemplary user database in accordance with one or more embodiments of the present invention.

The user database 406 stores user accounts that contain user information. An exemplary record structure for the user database 406 is shown in FIG. 5. The user database 406 includes a user identifier 502, a name 504, an address 506, a password 508, and a device field 510 comprising a list of electric devices 208 owned by each user. For each electric device 208 recorded in the user database 406, there is stored an associated device identifier 512 for identifying the electric device 208, a further identifier 514, herein referred to as a "pseudo-identifier", which also identifies the electric device 208, a location identifier 516 identifying a location associated with the electric device 208, device operating characteristics, such as user defined availability 518 and device energy recovery properties 520, and a statistical profile 522. The device operating characteristics may also define a device type (i.e. whether the device is an air conditioning unit, a refrigerator, or an immersion heater, for example) for the electric device 208. The user database 406 may also include bank details and/or contact details, such as an address or a telephone number of the user. Uses of the information stored in the user database 406 will be described in more detail below.

The user interface 410 is arranged to transmit and receive information to/from the user via a fixed or wireless communications means, such as ADSL, GSM, and/or 3G. The user database 406 can be accessed and updated by a user via the user interface 410 using authentication means and access control mechanisms, such as by correctly entering the password stored in the user database 406. The user is able to register one or more electric devices 208 to his/her user account, via the user interface 410 and/or update information stored in the user database 406 associated with the electric devices.

Figure 6:
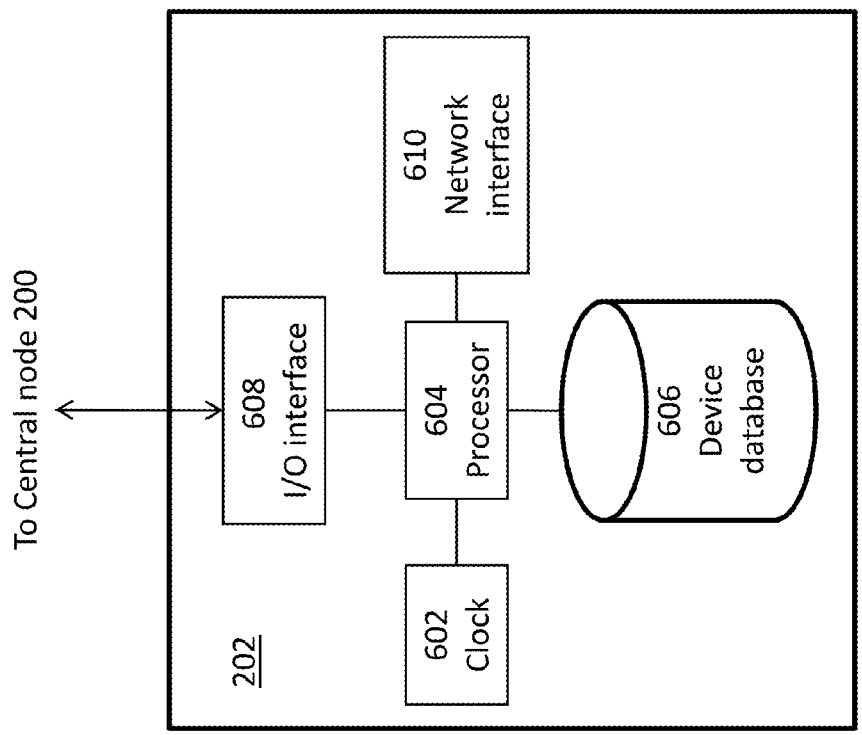
FIG. 6 shows a control node in accordance with one or more embodiments of the present invention.

Exemplary components of a control node 202 are shown in FIG. 6. The control node 202 comprises a clock 602, a processing means in the form of a processor 604, a device database 606, a communications means in the form of a communications interface 608, and an input means in the form of a network interface 610.

The device database 606 contains a portion of the user database 406 that may be communicated to the control node 202 via a communications link that may be established between the communications interfaces 408, 608. An exemplary record structure for the device database 606 is shown in FIG. 7. The device database 606 includes profile information relating to the electric devices 208, such as a device identifier 702, a pseudo-identifier 704, a device location 706, device operating characteristics, such as user defined availability 708 and device energy recovery properties 710, and a field for recording device statistics 712 relating to the energy consumption/provision of each electric device 208. Typically, the device database 606 does not contain any information relating to the user.

The network interface 610 is arranged to receive instructions from a party, such as a control scheme operator, to control energy consumption in a given area for a given time period. The network interface 610 is arranged to receive these instructions via a fixed or wireless communications means, such as ADSL, GSM, and/or 3G.

In response to receipt of these instructions, the control node 202 is arranged to send requests to the electric devices 208 in the area associated with the control node via the communication interface 608, as is described in more detail below. These requests may be sent using the device identifiers 702 stored in the device database 606; the device identifiers 702 may comprise a network address, such as an IP address enabling the electric devices 208 to be identified for the purposes of sending these requests. The electric devices 208 and/or their associated electric device control units 210, include a communications interface 306 for receiving requests and other information from, and sending information to, the control node 202. Herein, for conciseness, reference is made to electric devices 208 receiving and/or sending information, without reference being made to the electric device control units 210; however, where such reference is made, it will be understood that this also includes information being sent to and/or from to an associated electric device control unit 210.

The control node 202 may be arranged to collect statistical data relating to energy usage of individual electric devices 208 under its control. As mentioned above, the electric flow control units 210 may include a smart meter 302; data relating to energy consumption of the associated electric device 208 may be communicated to the control node 202, allowing it to build up statistical data relating to, for example, times of the day that the electric device 208 is frequently used (and therefore consumes and/or provides electric energy), how much energy it consumes or provides, and so on. This statistical information may be stored in the "recorded statistics" field 712 of the device database 606. It may also be communicated to the central node 200 for storage in the statistical profile field 522 of the user database 406.

Some of the data stored in the device database 606 is received from user database 406 at the central node 200, having being provided by a user; for example, the location indicators 516, and user defined device availability 518 are typically provided to the device database 606 in this way. The pseudo identifiers 514 mentioned above are used for this purpose. The pseudo identifiers 704 for a given electric device 208 stored in the device database 606 are the same as, or correspond to, the pseudo identifiers 514 for said given electric device 208 in the user database 406. When a change in the information stored in the user database 406 occurs, for example, due to the user changing information, such as an availability associated with one or more of his/her devices, via the user interface 410, the processor 404 of the central node 200 may communicate this change to the control node 202 via the communications interface 408. The change of data is communicated using the pseudo identifier of the corresponding electric device 208, enabling the processor 604 of the control node 202, to identify the relevant electric device 208 in the device database 606, and to make the necessary changes to the corresponding entry in the device database 606. Similarly, any data relating to a specific electric device 208 that is sent from the control node 202 to the central node 200 can be sent using the pseudo identifier to identify the relevant electric device.

Using the pseudo identifiers in this way improves data security, for the following reasons. Firstly, since the pseudo identifiers are different to the device identifiers which are used for communications between the control node 202 and the individual electric devices 208, it is more difficult for a nefarious third party monitoring communications to determine the location, or any other characteristic, of the electric devices 208 to which the communications relate. Secondly, the pseudo identifiers, in contrast to the device identifiers, do not themselves provide any information regarding e.g. a network location of the electric device in question. This is advantageous in situations in which, for example, availability information of an electric device 208 is being communicated, since it is clearly undesirable to reveal to a third party who may be "listening in" on any communications both a location of an electric device, and a time when it is available to be controlled, since the latter may indicate that the property at which the electric device is located will be unoccupied at that time. The pseudo identifiers may be varied regularly, for example daily, in order to further improve data security.

Communication between the central node 200 and the control nodes 202 are typically via the communication interfaces 408, 608.

Figure 8:
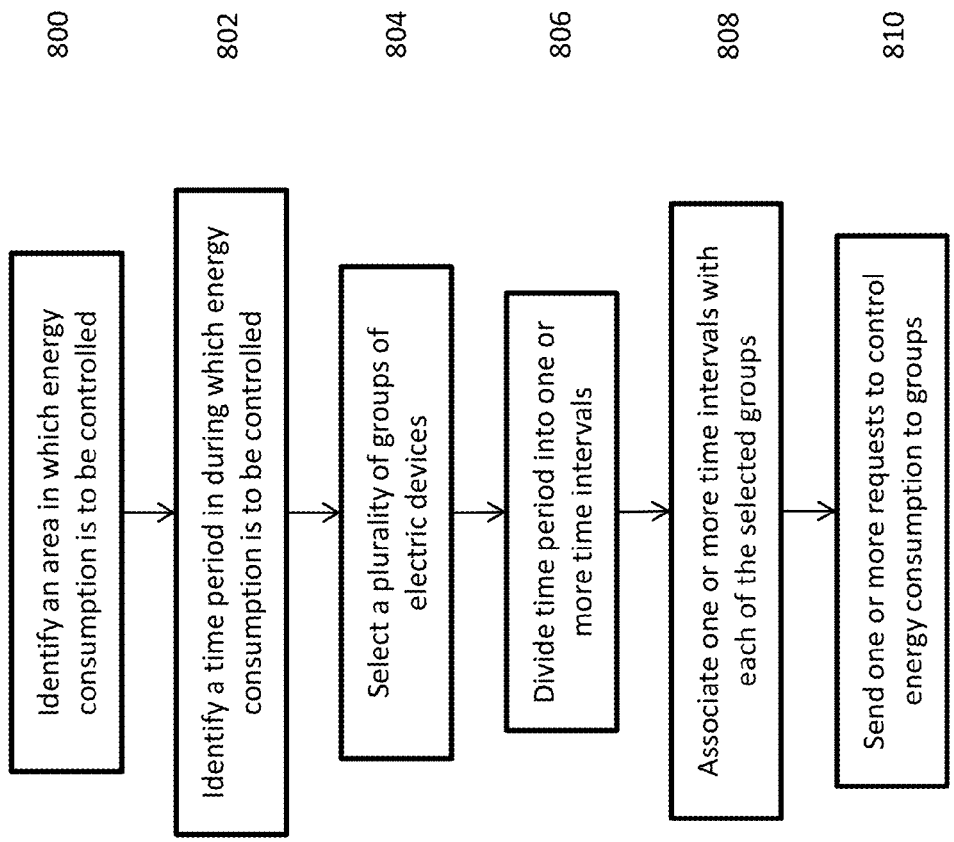
FIG. 8 is a flow diagram of a process for controlling energy consumption in a distribution network in accordance with one or more embodiments of the present invention.

FIG. 8 illustrates a method by which the control node 202 controls energy consumption in a given area for a given time period. In the following discussion, reference is made to the control node 202 performing various actions. Although omitted for conciseness, it will be understood that the actions are typically performed by the processor 604, in conjunction with the clock 602, where appropriate.

At step 800, the control node 202 identifies a given area, within the geographical area associated with the control node 202, in which energy consumption is to be controlled; typically, this identification is performed on the basis of instructions received via the network interface 610. For example, if a control node is associated with a country, the control scheme operator may send instructions to the control node 202 to control energy consumption in a particular geographic region, such as a city, street, postcode, or any other area comprising multiple user premises (i.e. multiple residences or workplaces). At step 802, the control node 202 identifies a time period (e.g. a time of day) during which energy consumption is to be controlled; again, this information may be included in the instructions received via the network interface 610.

At step 804, the control node 202 selects a plurality of groups of electric devices 208 based on the identified area and time period. The electric devices 208 are selected based on the location indicators stored in the device database 606, so that only electric devices located in the identified area are selected. The control node 202 may also use information about user defined availability and/or energy recovery properties stored in the device database 606 to allocate groups. In some embodiments, the statistical information from previous time periods is used by the control node 202 to determine the availability of a given electric device 208. At step 806, the control node 202 divides the time period into a plurality of time intervals. At step 808, the control node associates each of the selected groups with one or more time intervals, with different time intervals being associated with different groups. The time interval associated with a given group is the time interval, of the time period, during which electrical energy consumption/provision is to be controlled for that group.

At step 810, in each time interval the control node 202 sends one or more requests to control energy consumption to the electric devices 208 of each of the groups associated with that time interval in a given area. These requests are received by the electric devices 208, and result in a reduction of net consumption of electrical energy and/or an increase in provision of electrical energy, by a respective group in a respective time interval by, for example, causing the electric device control unit 210 to operate the control element 304, thereby resulting in a reduction of electrical energy consumption or an increase of electrical energy provision by the electric device 208. The net energy consumption of a given group of energy devices 208 is here defined as the difference between the total amount of energy consumed by, and the amount of energy provided by, the electric devices 208 of the given group; in other words, energy provided (e.g. generated) by an electric device 208 is defined as "negative consumption" of an equivalent amount of energy. A reduction in net electrical energy consumption may thus be achieved by disconnecting electric devices 208 from the electricity distribution network 102, or otherwise reducing an amount of electric energy consumption of the electric device 208, in the case of electric devices 208 arranged to consume electric energy and/or by connecting electric devices 208 to the electricity distribution network 102, or otherwise increasing an amount of electric energy provision of the electric device 208, in the case of electric devices 208 arranged to provide electric energy.

Although in the above-described exemplary method, the electric devices were selected, at step 804 based on location indicators, in some embodiments, the selection may alternatively or additionally be made based on other profile information relating to the electric devices, such as the profile information stored in the device database 606, as described above. In such embodiments, the step of identifying an area in which energy consumption is to be controlled (step 804) may be omitted.

By controlling the energy consumption and/or provision of multiple groups of electric devices 208 as described above with reference to FIG. 8, a net amount of energy consumption in the given area identified at step 800 can be reduced during the time period identified at step 802.

The control node 202 may generate heuristic models of the groups and assess their suitability against energy management criteria. The energy management criteria may include financial data. The financial data may relate to one or more of a time dependent energy market value, a balancing management service, and a constraint management service. The energy management criteria may be responsive to balancing requirements of the transmission and/or distribution grids and/or an emergency capacity requirement of the grids, and may include a required reduction in transmission grid congestion, or a required reduction in distribution grid congestion. The assessment may include determining which model provides the largest increase or decrease in energy consumption in a given time interval, which model provides a required time shift of a peak in energy demand, or which model provides the largest saving in energy cost. The heuristic models may include time dependent energy prices, determined based on current and/or predicted market values of electrical energy. The control node 202 may determine which electric devices 208, or groups of electric devices 208 to control in each time interval on the basis of the assessment of the generated heuristic models; in this way the control node 202 can optimize the assignment and control of the groups of electric devices 208 to manage energy demand in the required way.

In some embodiments, the control node 202 may, for a given control start time, create a limited set of heuristic models, covering a wide range of implementation strategies, by varying the parameters of the model. For example, the assignment of electric devices 208 to groups, the time intervals in which each control group is controlled, and the degree to which each group is controlled in different time intervals may all be varied. Since the parameter space for such a multivariable model is relatively large, the control node 202 may select parameter values randomly or may select parameters based on historically successful models. The control node 202 may then determine one or more characteristics or values of electric devices in each of the heuristic models, and may determine characteristics of a preferred model, based on an evaluation of the effectiveness of the model as assessed against the energy management criteria. The characteristics may relate to operating characteristics, energy recovery characteristics or other characteristics of electric devices 208 that are available for control by the control node 202. The control node 202 may also generate a set of financial forecasts for the set of heuristic models, including the preferred model. The control node 202 may then select groups at least partly on the basis of the characteristics of the preferred model.

In some embodiments, the control node 202 may interpolate between, or extrapolate from, the results of the assessment of the heuristic models (or the generated financial or energy consumption data) and may determine the characteristics of a preferred model on the basis of interpolated and/or extrapolated characteristics to establish an optimal strategy for assigning and controlling groups of electric devices 208. This reduces the computational burden on the control node 202 by reducing the number of calculations that must be performed to determine the optimal strategy to be implemented. This in turn increases the speed at which the control node 202 can react to changing energy demand and/or energy market conditions, thereby increasing the effectiveness of the control node 202. Furthermore, the computational burden on the control node 202, and therefore the cost of implementing the control node 202 can be reduced.

Figure 9:
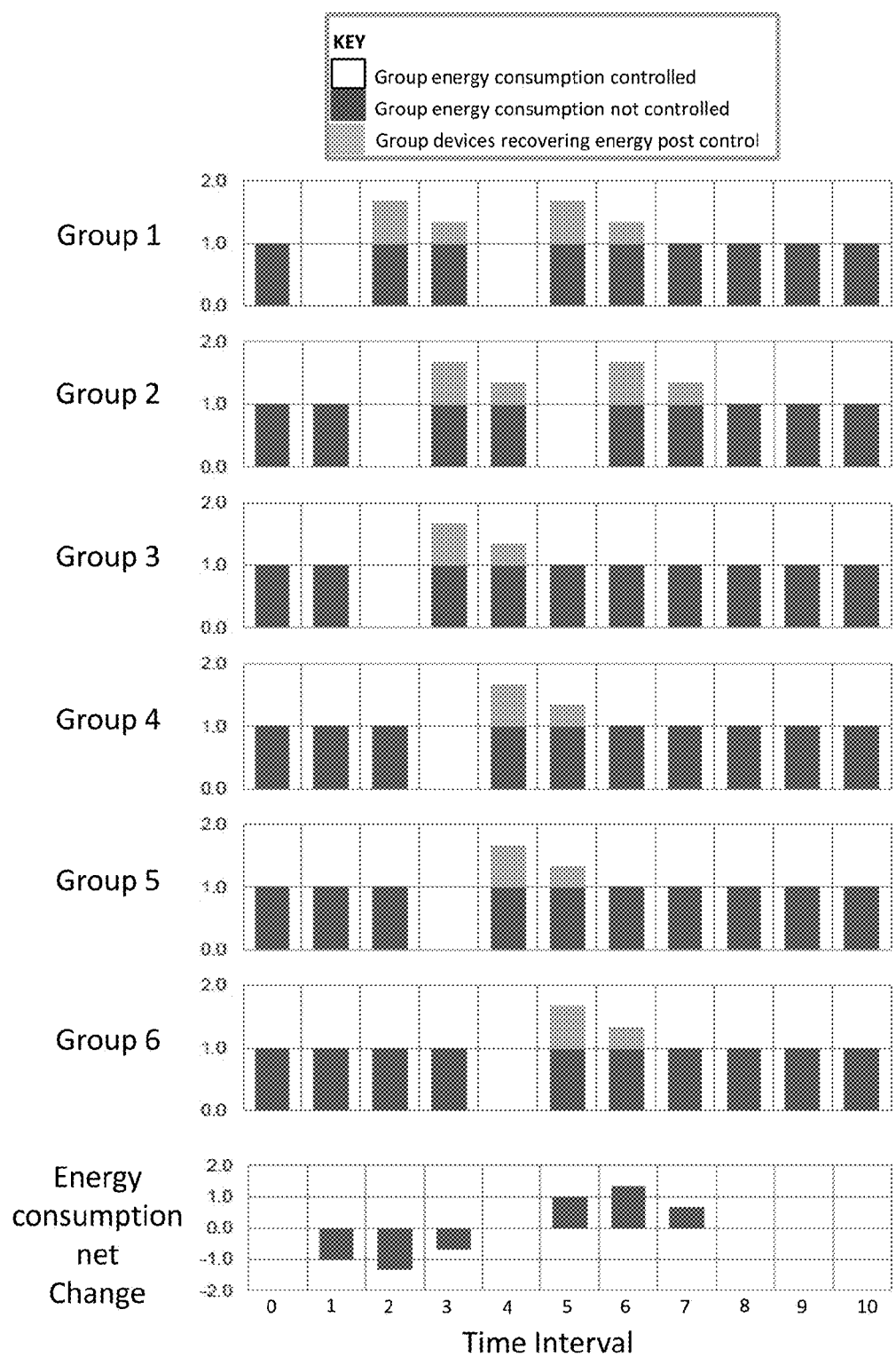
FIG. 9 shows net energy consumption patterns of groups of electric devices under the control of a control node in accordance with one or more embodiments of the present invention.

FIG. 9 is a graphical representation of an example in which there are six groups defined, namely Group 1 to Group 6, with each group having a default level of energy consumption of one unit i.e. in the absence of any control, each group consumes one unit of energy per hour throughout the period shown. In this example, energy consumption is controlled (i.e. the energy consumption of at least one group is reduced) during the time period from time interval 1 to time interval 5. Each group is controlled, by means of the aforementioned requests from the control node 202 to reduce net energy consumption during the corresponding one or more associated time intervals. In the example of FIG. 9, each of the time intervals are assumed to have a one hour duration; however, it will be understood that the duration of the time intervals can be varied according to requirements.

In the example shown in FIG. 9, group 1 is turned off (i.e. the energy consumption of same is reduced to zero) during the first time interval; groups 2 and 3 are turned off during the second time interval, groups 4 and 5 are turned off during the third time interval; groups 6 and 1 are turned off during the fourth time interval and group time intervals. Immediately after each time interval during which the electric devices 208 of a given group are turned off, the latter are turned back on; this may be the result of further requests sent from the control node 202, for example.

By reducing (i.e. inhibiting) energy consumption associated with the electric devices 208 in each of the groups sequentially, the total amount of energy consumed in a given area during the first, second and third time intervals can be reduced without requiring that any single electric device 208, or group thereof, is turned off for any consecutive period longer than a single time interval, meaning that the inconvenience to users of electric devices can be reduced.

As shown in FIG. 9, the net consumption of each group typically increases after each time interval when the group has been turned off. This is due to factors such as individual electric devices 208 having to work harder to recover energy lost during periods of inactivity; for example, in the case of an air conditioning unit, the room which the latter cools may have heated significantly during the "off" time interval, resulting in the air conditioning unit consuming a greater amount of energy when it is turned back on. A further factor is that users may be statistically more likely to use electric devices 208 in periods after they have been unavailable. The extent to which an electric device 208 recovers energy, on average, following "off" intervals, and the average length of time it takes to recover this energy are referred to herein as the "energy recovery properties" of the electric device 208.

Each of the electric devices 208 in each group in the example of FIG. 9 are assumed to have the same energy recovery properties; after 1 hour of being turned off, the devices recover ⅔ unit of energy in the first subsequent hour and ⅓ unit of energy in the second subsequent hour. The dark shaded regions in the figure represent energy consumption of groups in an uncontrolled state. The lightly shaded regions represent energy usage that increases due to the energy recovery described above. The net result in this example is that a total energy of 3 unit hours is shifted by an average of 4 hours forward. This shift in energy consumption is greater in magnitude and time than if each group had acted independently of each other, and/or if individual devices are controlled in an un-aggregated manner.

Although in the example of FIG. 9 all of the reduction in energy consumption during time intervals 1 to 3 is offset by a subsequent increase in energy consumption during time intervals 5 to 7, it will be appreciated that, in practice, the subsequent increase in energy consumption is typically not 100% of the initial reduction in energy consumption, since the electric devices 208 will not necessarily be used during the subsequent periods, and, for example, an air conditioning unit may not need to use all of the energy it would have used during an off period to cool a room back to the desired temperature.

Further, it can be seen that even where there is significant subsequent increase in subsequent energy consumption, sequentially controlling net energy consumption of multiple groups enables the overall load on the electricity distribution network 102 to be dynamically shaped. The method described above with reference to FIGS. 8 and 9 can be used to alter the timing and/or size of a peak in energy consumption. For example, if a peak of energy consumption in a given geographical area is expected to occur during time intervals 1 to 3 of FIG. 9, controlling energy consumption as described with reference to FIG. 9 may have the effect of shifting the timing of the peak, and/or reducing its magnitude, which may avoid or ameliorate the "hot spots" described above. Since not all electric devices 208 in the given geographical area are necessarily controlled, the peak in consumption of these uncontrolled electric devices 208 will occur during time intervals 1 to 3, whereas the peak due to the controlled electric devices 208 is shifted to time intervals 5 to 7, as shown; this has the effect of smoothing out the peak (i.e. spreading it over a longer time period), and reducing its magnitude. The amount of energy that is shifted, and the length of time by which it is shifted may be determined by the processor 604 of control node 202, using the profile information relating to the electric devices 208 which is stored in the device database 606.

If the control node 202 receives instructions (for example as part of the instructions described with reference to steps 800 and 802 above) to shift a given amount (e.g. 3 MWh) of energy consumption in a given geographical area by a given average time length, step 804 described above may comprise the control node 202 selecting groups containing electric devices 208 whose expected average power consumption totals the given amount (i.e. 3 MWh), and whose energy recovery properties are such that the length of time by which the energy consumption is shifted averages the given average time length. The control node 202 may then send requests via the communications interface 608 to the electric devices 208 of the groups to turn off during associated time intervals. The electric devices 208 in a given group may be polled after sending to the requests to confirm the actual reduction in energy consumption. In the case that the actual reduction in energy consumption is determined to be either above or below the required amount, the group allocations may be adjusted, and the process repeated until the correct energy reduction is achieved.

In the above example, the time intervals during which individual groups are controlled are did not overlap. However, in some embodiments, the control node 202 may overlap the time intervals during which different groups are controlled, for example, to allow the time intervals to coincide with the user defined availability preferences. In some embodiments, the duration of the different time intervals may be varied, for example, as the availability of electric devices 208 in a given group changes during the given time period.

Figure 10:
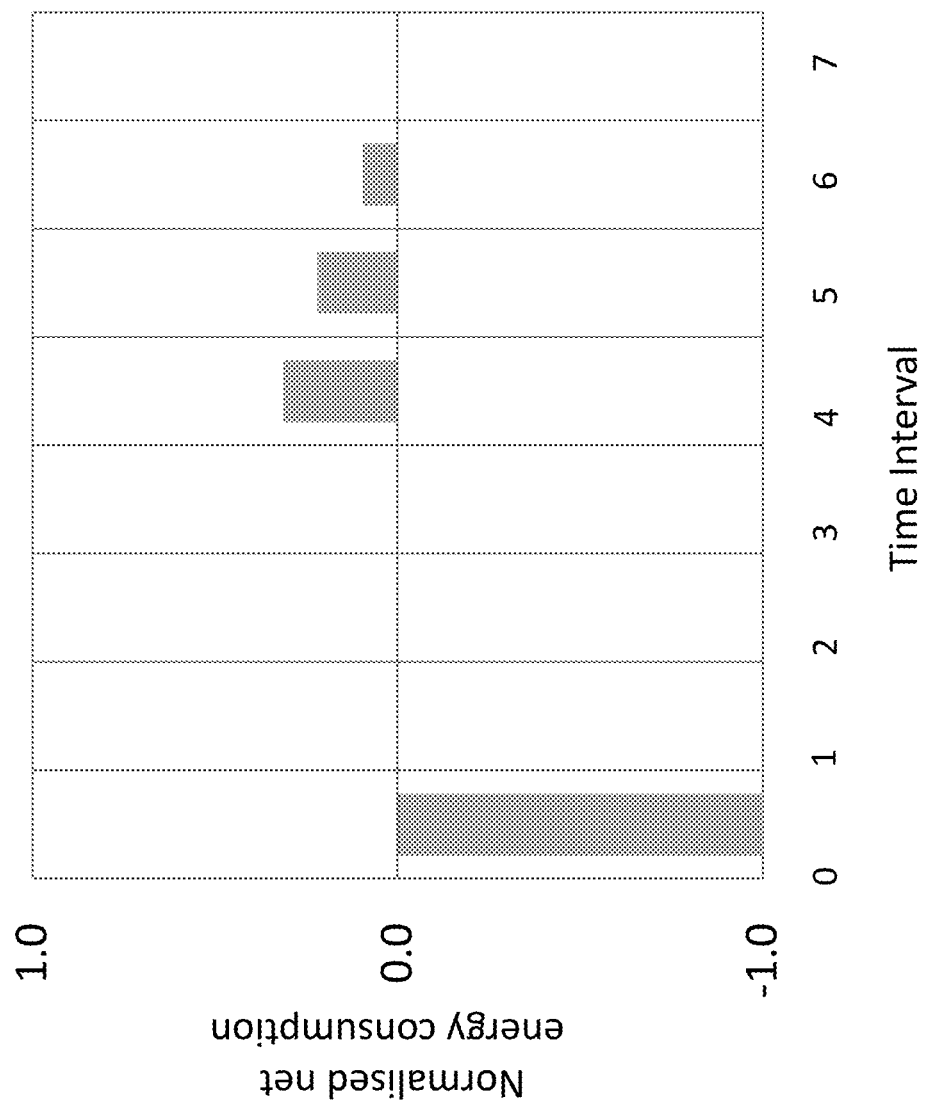
FIG. 10 is a graph showing an example of energy consumption being offset in accordance with one or more embodiments of the present invention.

As described above, after a group has been used to reduce net energy consumption it will typically recover that energy (or a proportion thereof) in subsequent time intervals. In some embodiments of the invention, the control node 202 manages this recovery, based on, for example, requests received from the network operator, by using different groups to reduce energy consumption in subsequent time intervals. In this way, the control node can shape the energy consumption profile during the time period and significantly push back net consumption of electric energy in the given geographical area as necessary. As mentioned above, instructions may be issued to the control node 202 to reduce energy consumption by a given amount in a given time period. For example, it may be desired to reduce energy consumption in time interval 0 and arrange so that there is no net recovery in energy consumption until after time interval 3. A target energy consumption graph representing these requirements is shown in FIG. 10. In response to such instructions, the control node 202 uses an algorithm to assign appropriate groups to meet the target energy consumption. An exemplary method for determining the properties of these groups is now described with reference to FIGS. 11*a* and 11*b*.

Figure 11A:
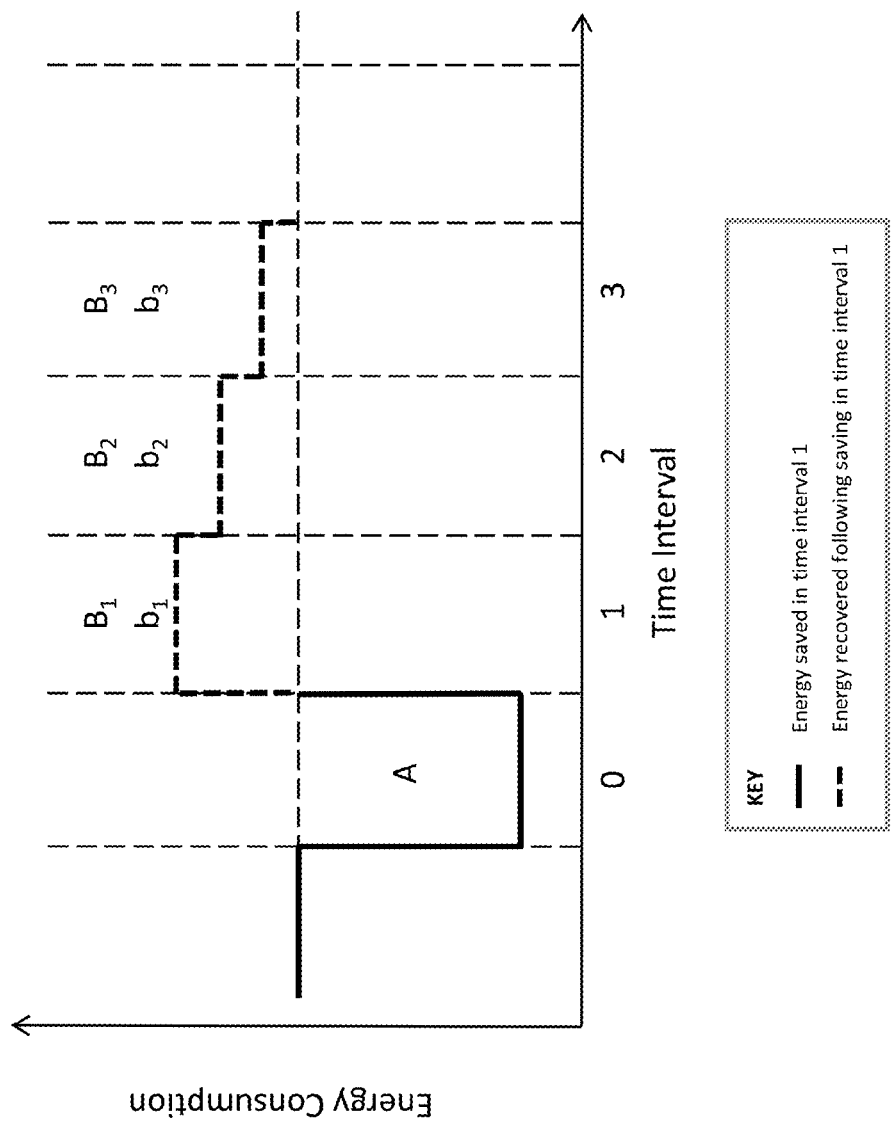
FIG. 11a shows energy consumption of an exemplary group of electric devices under the control of a control node in accordance with one or more embodiments of the present invention.

As can be seen from FIG. 11*a*, an amount of energy, A, has been saved in time interval 0 by, for example, turning off a particular group, which we refer to as "group 1", of electric devices 208. Each electric device 208 of group 1 is chosen to have the same energy recovery properties as shown by the dashed line. In this example, group 1 recovers amounts of energy $B_1$ in time interval 1, $B_2$ in time interval 2, and $B_3$ in time interval 3, respectively. These amounts of energy are each a fraction $b_i$ of A that is recovered in time interval i such that $$b_i = \frac{B_i}{A}$$

and $$A \leq \sum_i A \cdot b_i$$

In this example, as mentioned above, the control node 202, is operating under a requirement that that the overall energy consumption in the given area does not exceed a given level (that represented by line 0.0 in FIG. 10) until after interval 3. To achieve this, additional groups 2, 3, and 4, each having similar group availability and recovery properties are controlled in subsequent time slots in order to offset the additional energy consumed by group 1 when recovering in time intervals 1, 2, and 3, as described below. Additionally, energy consumption reduced for group 2 in time interval 1, which is wholly or partially recovered during time intervals 2, 3 and 4 is also offset by reducing energy consumption of further groups, and so on. In the following description, A refers to a decrease in energy consumption below the level represented by line 0.0 in FIG. 10 in time interval 0 and $B_{xy}$ refers to an increase in energy above the normal level in time interval x as a result of using a group in time interval y.

Figure 11B:
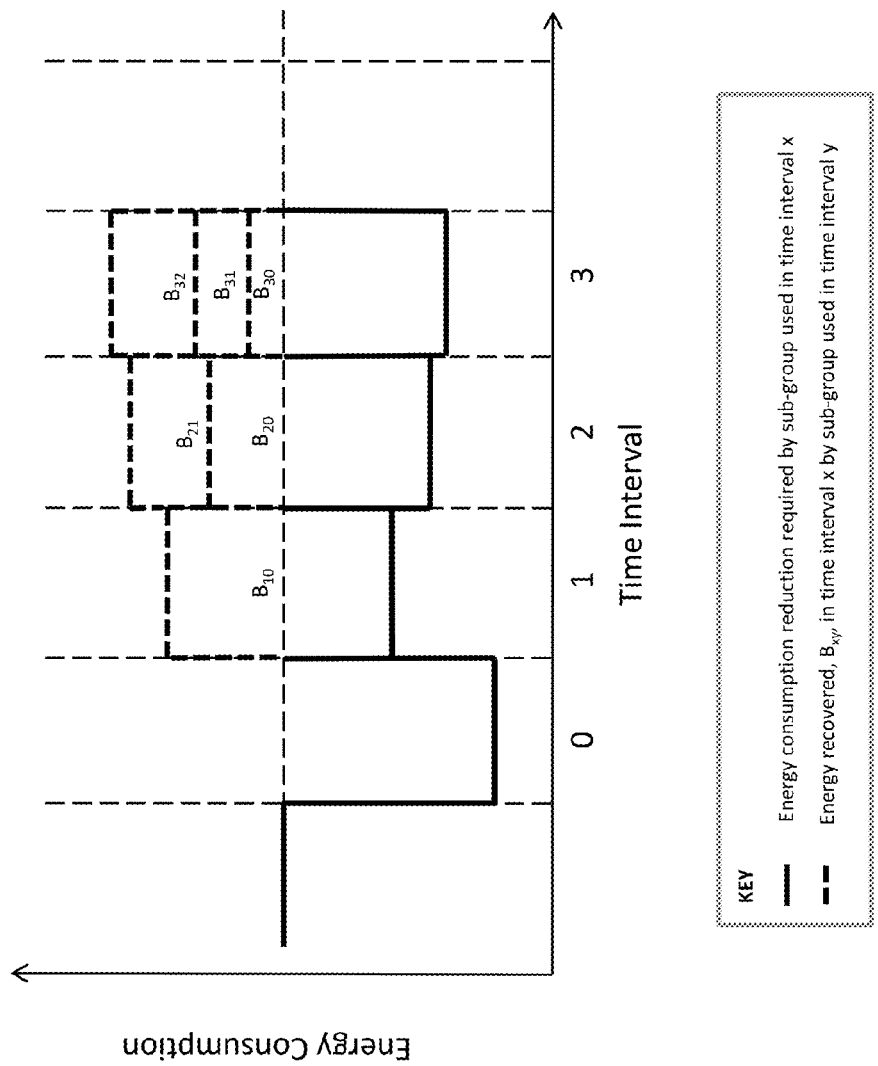
FIG. 11b is a graph showing energy consumption patterns of multiple groups being controlled in accordance with one or more embodiments of the present invention.

As illustrated in FIG. 11b, the amount of energy, E(t), required to offset energy consumption recovery in time interval 1 is the amount of energy that group 1 recovers during that time interval, given by:

$$E(1)=b_i \cdot A$$

The control node 202 therefore selects a further group, group 2, and reduces the energy consumption of group 2 by amount E(1) during time interval 1. The amount of energy required to offset energy recovery in time interval 2 is the amount of energy that group 1 recovers during time interval 2 plus the amount of energy that group 2 recovers during time interval 1, given by:

$$E(2)=B_{20}+B_{21}=b_2 \cdot A + b_1 \cdot b_1 \cdot A = A(b_1^2+b_2)$$

The control node 202 therefore selects a further group, group 3, and reduces the energy consumption of group 3 by amount E(2) during time interval 2. Accordingly, the energy required to offset energy recovery in time interval 3 is the amount of energy that groups 1, 2, and 3 recover during time interval 3, given by:

$$E(3)=B_{30}+B_{31}+B_{32}=A(b_1^3+2b_1 b_2+b_3)$$

The control node 202 therefore selects a further group, group 4, and reduces the energy consumption of group 4 by amount E(3) during time interval 3. Energy consumption offsets in subsequent time intervals can be calculated in the same manner, if required. Using this approach the control node 202 can determine the amount of energy consumption that must be reduced in each time interval in order to push back recovery of energy to a later time interval. In addition, the control node 202 can use these calculations to determine the energy consumption pattern when all groups are finally allowed to recover their energy.

Thus, by selecting groups of electric devices 208 based on their energy recover properties, and by controlling energy consumption of the selected groups so that the total energy recovery of the groups in a given time interval is offset by a reduction in energy consumption, it is possible to shift a desired amount of energy consumption by a desired length of time. The amount of energy consumption that is reduced by a given group during a given time interval may be varied by varying the number and/or the properties of electric devices 208 in the group. Similarly, the shape of the energy recovery can be controlled by selecting electric devices 208 according to their energy recovery properties. In the examples described above in relation to FIGS. 9 to 11b, all electric devices 208 in the groups were assumed to be available for control during the whole of each associated time interval. However, it is also possible to form groups including electric devices 208 having availability profiles which do not allow the electric device 208 to be turned off during the whole of a given time interval, as is now described with reference to FIGS. 12a and 12b.

Figure 12A:
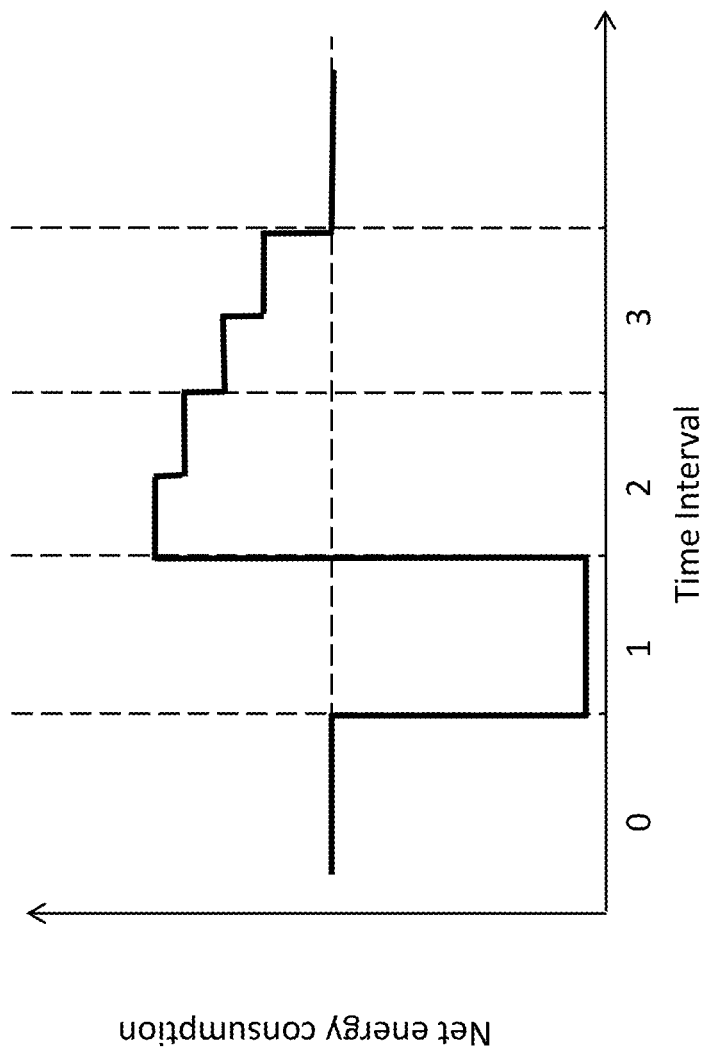
FIG. 12a shows an aggregate energy consumption pattern of multiple groups of electric devices being controlled to form a group in accordance with one or more embodiments of the present invention.
Figure 12B:
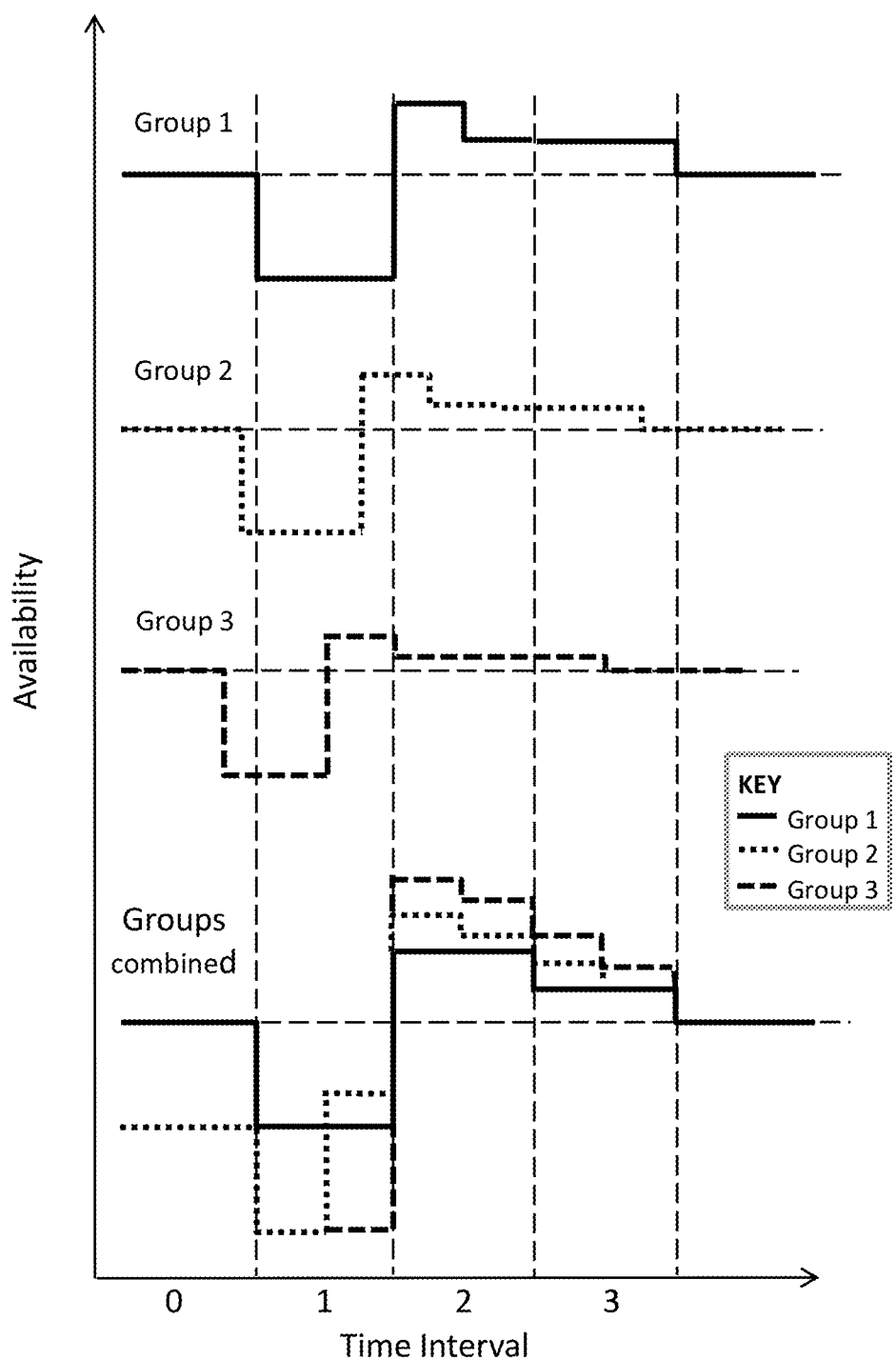
FIG. 12b shows energy consumption patterns of groups of electric devices for use in one or more embodiments of the present invention.

In this example, the control node 202 requires a group to be controlled for one hour, as shown in FIG. 12a. As device availability is defined by user preferences and thus may not match the requirements of the network operator (i.e. some users may prefer not to have their devices controlled for the whole time interval), the control node 202 can aggregate groups to build a net reduction in energy consumption during a given time period. In this example, there are three groups of electric devices 208 available for control, namely group 1, group 2, and group 3. Each of the groups is assumed to comprise electric devices 208 having average energy recovery properties such that half of the energy saved when the group is controlled off (or its net consumption reduced) is claimed back in 45 minutes. For clarity, the behavior of the groups is represented as an approximated square-wave response; in practice, the energy recovery typically follows an exponential pattern. Each group has a different availability, defined by user preferences, and shown in FIG. 12b. Group 1 comprises electric devices 208 having an availability profile allowing them to be turned off (or have their energy consumption reduced) for 1 full hour; group 2 comprises electric devices 208 having availability profiles such that they may be turned off (or have their energy consumption reduced) for 45 minutes; and group 3 comprises electric devices 208 having availability profiles such that they may only be turned off (or have their energy consumption reduced) for 30 minutes.

A group of electric devices 208 whose consumption is controlled during a first time interval can be formed by the processor 604 of the control node 202 as follows. The control node 202 sends requests, via the communications interface 608, to the electric devices 208 of group 1 to turn off (or to reduce energy consumption) for all of the first time interval, to the electric devices 208 of group 2 to turn off (or to reduce energy consumption) during only the first 30 minutes (of its available 45 minutes) of the first time interval; and to the electric devices 208 of group 3 to turn off (or to reduce energy consumption) for the period from 30 minutes to one hour of the first time interval. Typically, the groups consist of large numbers of electric devices 208, meaning that the number of electric devices 208 that are turned off (or have their energy consumption reduced) in a given group can be varied to vary the size of the reduction in net consumption associated with the group, so that, for example, the amount of reduction in energy consumption is substantially constant across the whole of the first time interval, as shown in the combined graph of FIG. 12b, in which the contribution from group 1 is shown by the solid line, the contribution from group 2 is shown by the dotted line and the contribution from the group 3 is shown by the dashed line.

In some embodiments, reclamation of energy saved in the first time interval takes place over more than the two time intervals shown in the example of FIG. 9. The energy reclamation of a given electric device is stored in the 'energy recovery properties' field of the device database 606 at the control node 202. The control node 202 uses the energy reclamation characteristics of each of the electric devices 208 under its control to develop strategies for shaping the overall profile of energy consumption in the electricity distribution network.

Figure 13:
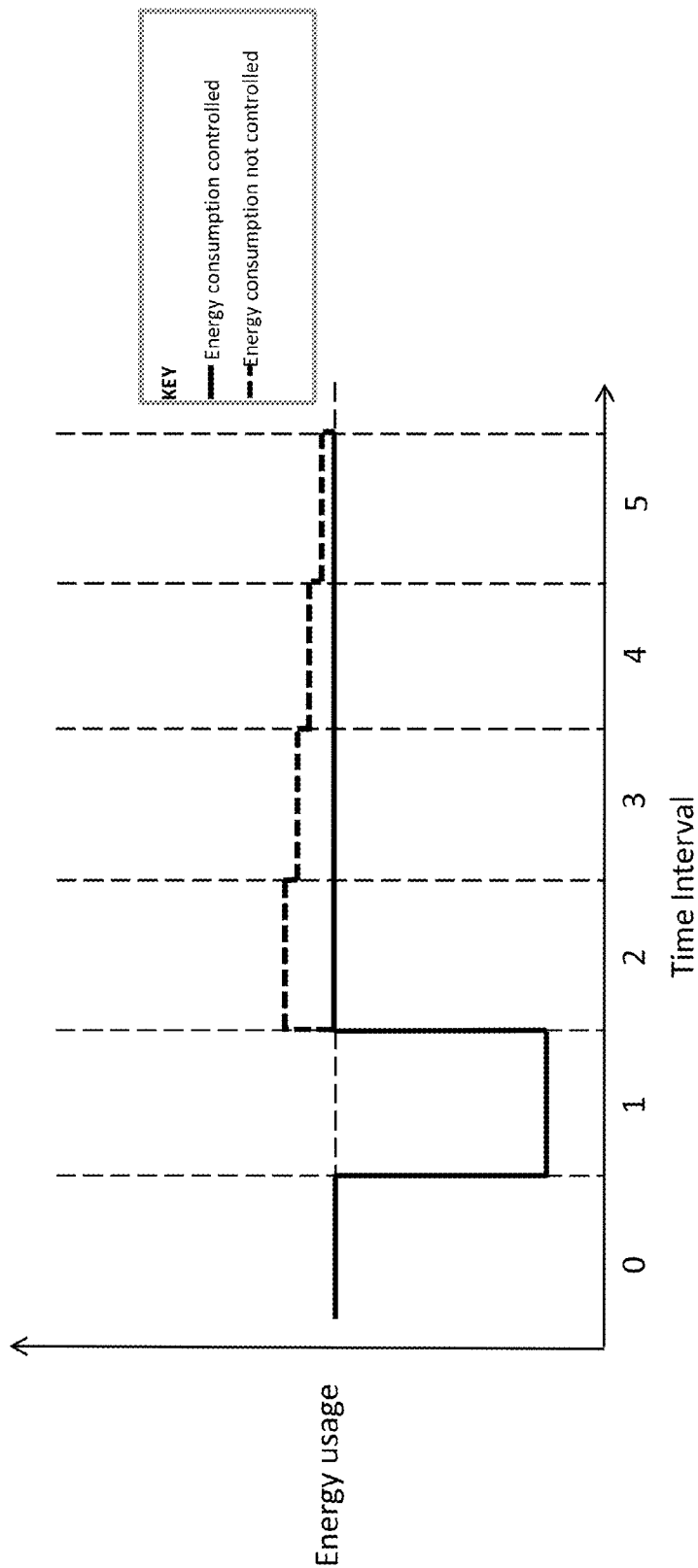
FIG. 13 shows an energy recovery profile of an electric device for use in one or more embodiments of the present invention.

FIG. 13 shows an example where the electric device 208, which may be, for example, a water heater, has a long period of energy recovery relative to the time interval (1 hour). The dashed line of FIG. 13 shows the energy reclamation characteristic of this electric device 208. As can be seen, the time taken to reclaim energy covers many time intervals and importantly the amount of energy reclaimed by the electric device 208 in each of the subsequent time intervals is considerably less than the amount of energy saved during time interval 1. It is therefore much easier to push saved energy reclamation to future time intervals, by controlling other groups off in the subsequent time intervals, if the electric devices 208 used do not reclaim energy quickly but rather over an extended period of time. This is shown by the solid line in FIG. 13, which represents desired energy consumption. Thus by grouping electric devices 208 appropriately, and by selecting electric devices 208 having appropriate characteristics, such as electric recovery properties, it is possible to manipulate the shape of power consumption in a given area.

Figure 14A:
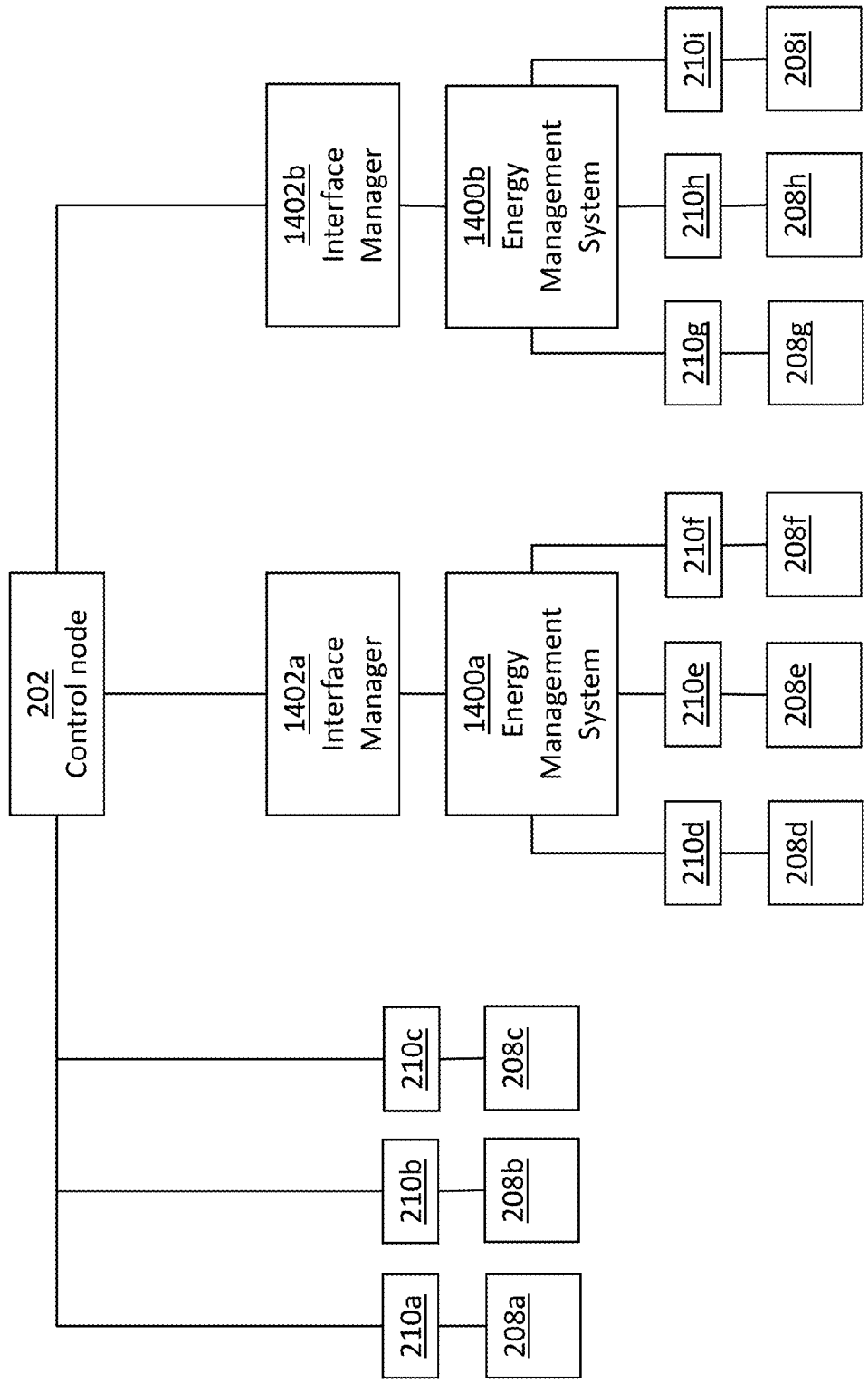
FIG. 14a shows a system in which the control node interfaces with an energy management system in accordance with one or more embodiments of the present invention.

As shown in FIG. 14a, in some embodiments, one or more electric devices 208 may operate under the control of a computer-based energy management system (EMS) 1400, which may be a building management system (BMS), for example. The EMS 1400 typically monitors, controls, and optimizes energy demand and/or consumption (or provision) of one or more electric devices 208 according to energy management rules (EMS rules), which may be defined locally. Typically, the EMS 1400 is located at a particular premises (site, or building), and provides local energy management. In some arrangements, the EMS 1400 may control distributed electric devices 208 that share a common ownership (for example, distributed electric devices 208 all owned by a particular business).

Types of electric devices 208 under the control of the EMS 1400 may include one or more of heating, refrigeration, ventilation, lighting, power supply, fire, and security devices. Each EMS 1400 may comprise hardware and software components for controlling the power usage of electric devices 208 within, for example, a large building to manage the energy usage within the building. Typically, the EMS 1400 is configured to optimize the energy efficiency of a building while not disrupting or inconveniencing the users of the building (by, for example, shutting off power during business hours).

The control node 202 is arranged to interface with the EMS 1400 via an interface manager 1402 acting as a gateway. The interface manager 1402 enables the EMS 1400 to interface with other networks that use different protocols. The interface manager 1402 may include protocol translators, impedance matching devices, rate converters, fault isolators, and signal translators that provide the necessary interfaces for enabling the interface manager 1402 to transfer data to/from the EMS 1400, for example.

The interface manager 1402 may be capable of handling requests to control electric devices 208 from different types of energy management systems, including systems different to that described above.

Exemplary components of an interface manager 1402 are shown in FIG. 14b. The interface manager 1402 comprises an input/output interface 1404 arranged to interface with the control node 202, a EMS interface 1406 arranged to interface with the EMS 1400, a processor 1408, and a storage device 1410.

The input/output interface 1404 is arranged to receive data (including control requests) from, and send data to the control node 202. The EMS interface 1400 is arranged to send data to and receive data from the EMS 1400. The processor 1408 is arranged to process data passing through the interface manager 1402, as described in greater detail below.

The processor 1408 processes requests received from the control node 202 to control electric devices 208 under the control of the EMS 1400. The processor 1408 uses logic (which may be in the form of a program stored in the storage 1410) for determining which of the received requests are compatible with the EMS rules. Requests that are determined to be compatible with the EMS rules are passed via the EMS interface 1406 to the EMS 1400 to be implemented, and requests that conflict with the EMS rules are returned to the control node 202 without being passed to the EMS 1400. Upon receiving a returned request, the control node 202 may then update the device database 606 to indicate that electric devices 208 under the control of the EMS 1400 are unavailable for control, and may reassign groups and issue new requests accordingly.

The EMS rules may relate to a device availability defined by the user in addition to the availability defined in the user database. In an exemplary arrangement, the EMS 1400 may a control refrigeration unit in a business, such as a supermarket. The business may define EMS rules for controlling power to the refrigeration unit; for example, the business rules may dictate that the refrigeration unit is controlled off for no more than 1 hour in a 24-hour period. Upon receiving a request from the control node 202 to control off the refrigeration unit, the interface manager 1402 would compare the request with the EMS rules for the refrigeration unit to determine whether a conflict exists. For example, the request may be to control off the refrigeration unit for 2 hours, which would exceed the maximum time specified by the EMS rule. Or the request may be to control off the refrigeration unit for 30 minutes, but the interface manager 1402 may determine, by consulting the EMS 1400 that the refrigeration unit has already been controlled off for 45 minutes in the previous 24 hours, and so controlling the refrigeration unit off for 30 minutes would breach the EMS rules. In each of these exemplary cases, the interface manager 1402 may return the request to the control node 202 without passing the request to the EMS 1400.

The EMS rules may be time dependent rules that the user intends to take precedence over the user defined availability 708 of the electric devices 208 stored in the device database 606, or the EMS rules may be applied by the user on a temporary basis to override requests received from the control node 202 in response to a local event, such as a unexpected need to use a particular electric device 208. For example, the EMS 1400 may be operating in a particular supermarket store that is one of a chain of stores whose electric devices 208 are ordinarily available for control by the control node 202 according to user defined availability defined by the business. However, in response to a local event in a particular store, such as the failure of one or more of the electric devices 208 in that store, the store manager may want to override the normal availability of electric devices 208 in the store to meet the needs of the business. In some embodiments, the interface manager 1402 may include an override function, perhaps provided by an override switch or button, which when selected prevents the interface manager 1402 from passing any requests from the control node 202 to the EMS 1400. The override function may be provided in hardware or software, and may be remotely accessible to the user. This enables the user to override the control of the control node 202 quickly in an emergency.

In order to determine the compatibility of requests sent by the control node 202, the processor 1408 may interrogate the EMS 1400 via the EMS interface 1406 to determine whether there are any existing EMS rules for devices specified in the request sent by the control node 202. The processor 1408 may then compare the request with the EMS rules to determine if they are in conflict. The additional logic stored in the interface manager 1402 prevents requests sent by the control node 202 that conflict with the EMS rules from being passed to the EMS 1400 and disrupting the operation of electric devices 208 under the control of the EMS 1400. This prevents inconvenience being caused to the users of the building without requiring the owner of the EMS 1400 to update their user defined availability 518 in the user database 406 each time a EMS rule is updated.

Multiple requests for controlling electric devices 208 under the control of a EMS 1400 over an extended period (i.e. several hours) may be sent via the interface manager 1402 to the EMS 1400 in a single transmission. The interface manager 1402 may then compare the multiple requests with the EMS rules for the corresponding period, and pass the requests to the EMS 1400 if no conflict arises. If one or more conflicts arise, the interface manager 1402 may return all of the requests to the control node 202, or may pass the compatible requests to the BMS 1400 and return the conflicting requests to the control node 202. The interface manager 1402 may then cache, or buffer, the commands locally for implementation at scheduled times.

Transmitting all the requests for an extended period in one transmission has the advantage of enabling the EMS 1400 to control its electric devices 208 in line with the requests from the control node 202 in the event of a failure of the communication link between the control node 202 and the EMS 1400. Furthermore, electric devices 208 under the control of the EMS 1400, for which no particular EMS rules are defined (i.e. that are directly available for control by the control node 202), are protected from failure of the communication link. For example, if the communication link between the control node 202 and the EMS 1400 fails before a desired operation is complete, the electric device 208 under control will not be left in an unwanted state, because the interface manager 1402 has cached a complete set of requests. Furthermore, by sending multiple requests at the same time, the interface manager 1402 has an opportunity to determine the compatibility of the requests with the EMS rules in advance of time interval in which the request is scheduled for; therefore, the control node 202 receives returned requests much earlier than if the requests are sent at the time the control node 202 needs to control the electric device 208, and so the control node 202 has more time in which to reassign and control groups of electric devices 208. This reduces the computational burden on the control node 202, and enables the control node 202 to react to changes in availability of the electric devices 208 more quickly.

In some embodiments, the interface manager 1402 or the EMS 1400 may be able to detect a failure of the communication link between the control node 202 and the EMS 1400, and may, in response to the failure, generate requests locally to return the electric devices being controlled by the control node 202 to a state defined only by the EMS 1400. A communication failure may be detected, for example, by recognizing that an expected control request has not been received. This prevents electric devices remaining in an inappropriate state, following a communication link failure, and minimizes disruption and inconvenience caused to the users of the electric devices 208 under the control of the EMS 1400.

The techniques and methods described herein may be implemented by various means. For example, these techniques may be implemented in hardware (one or more devices), firmware (one or more devices), software (one or more modules), or combinations thereof. Hardware implementation may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a data store unit and executed by processors. The data store unit may be implemented within the processor or externally to the processor. In the latter case it can be communicatively coupled to the processor via various means, as is known in the art. Additionally, the components of the systems described herein may be rearranged and/or complemented by additional components in order to facilitate the achieving of the various embodiments, etc., described with regard thereto, and they are not limited to the precise configurations set forth in the given figures, as will be appreciated by one skilled in the art.

The above embodiments are to be understood as illustrative examples of the invention. Further embodiments of the invention are envisaged. For example, it is described above that a user may interact with, and provide information to, the central node 200 via the user interface 310 of the central node 200. In some arrangements, the user may instead interact with the central node 200 using a user interface located elsewhere, or use an internet browser to communicate with the central node 200 via the internet. In some arrangements, the communication described as being performed by a user could instead be performed automatically, for example using a computer algorithm which could be adapted to access the users calendar, and/or other personal information to determine available times of devices associated with the user, for example.

Further, it was mentioned above that a control node 202 may store address data indicating a network address, such as IP address, of one or more electric devices 208 with which it communicates. In some embodiments, the electric devices 208 may have a unique identifier incorporated such as a subscriber identity module SIM card, for example, in which case the address data comprises an identity number of the given SIM card, such as an MSISDN number. In some cases communications between electric devices 208 and the control nodes 202 may take place by transmission of data along the power lines, known as Power Line Communication (PLC).

The central node 200 and the control node 202 are described above as being implemented in discrete structures. However, the components and functions of these nodes, for example the user and device databases, may be implemented in a distributed manner, using a plurality of distributed physical structures.

In many of the above examples, energy flow to and/or from the electric device 208 was varied between two values (e.g. energy on/energy off). However, in some embodiments the energy consumption/provision may not simply be controlled by turning the devices on or off, but rather the control node 202 may control devices to operate at less than full capacity.

In many of the above examples described with reference to FIGS. 8 to 13, reduction of the net consumption of electrical energy is described in terms of controlling electrical energy consumption of groups of electric devices 208 in a given time interval. However, as mentioned above, in some embodiments, the selected groups comprise electric devices 208 which provide electrical energy to the electricity distribution network 102.

In this case, the control of the electric energy consumption in the given area identified at step 800 of FIG. 8 may include increasing an amount of energy provision by these providers of electrical energy. Thus, in the example of FIG. 9, a given group may comprise multiple energy providers who receive requests to provide energy during associated time intervals, rather than to cease or reduce consumption thereof, so that the reduction in consumption that results from the requests comprises an increase in energy provision.

Some energy providers may exhibit energy recovery patterns the same or similar to those described above in relation to energy consumers. For example, if the provider of electrical energy comprises an electric energy storage device, such as a PEV storing energy in its battery, it may be requested by the control node 202 to provide energy from its battery during a given time interval; during subsequent time intervals, the PEV may recover the provided energy as its battery recharges.

Energy providers which generate electrical energy, such as wind turbines, may not exhibit any energy recovery, since there is no requirement to "recharge" or otherwise recover electrical energy provided.

In some embodiments, the control node 202 selects a combination of groups comprising one or more groups that consume electrical energy and one or more groups that provide electrical energy. In some arrangements, one or more of the selected groups comprises a combination of electric devices 208 that consume electrical energy and electric devices that provide electrical energy.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling electrical energy consumption within an electricity distribution network, the electricity distribution network supplying electrical energy to a plurality of electric devices, wherein each of the electric devices is connectable to the electricity distribution network to consume electrical energy provided therefrom, thereby increasing a net amount of electrical energy consumption, and/or to provide electrical energy to the electricity distribution network, thereby decreasing a net amount of electric energy consumption, the method comprising:
   maintaining a device database comprising profile information, wherein the profile information relates to at least some of the electric devices;
   evaluating a plurality of models against one or more energy management criteria, wherein the plurality of models is generated by allocating electric devices based on the profile information;
   determining one or more characteristics of a preferred model based on the evaluation;
   identifying a time period during which consumption of electrical energy supplied by the electricity distribution network is to be controlled;
   selecting, based on at least the determined characteristics, a plurality of groups of the electric devices, each group comprising a plurality of the electric devices;
   associating one or more time intervals with each of the selected groups, the one or more time intervals associated with a given selected group being different to the one or more time intervals associated with the other selected groups, each said time interval being a time interval of the time period during which net electrical energy consumption of an associated group is to be controlled;
   sending one or more requests, for receipt at the electric devices of the selected groups, to control at least one of electrical energy consumption and provision by the electric devices, thereby reducing a net consumption of electrical energy, during a respective associated time interval.

2. A method according to claim 1, in which, for at least one of the selected groups, the one or more requests results in a reduction of electrical energy consumption associated with the at least one group.

3. A method according to claim 1, in which, for at least one of the selected groups, the one or more requests results in an increase of electrical energy provision associated with the at least one group.

4. A method according to claim 1, in which, in the case of an electric device arranged to consume electric energy, the one or more requests result in an amount of electric energy consumed by the electric device from the electricity distribution network being reduced during the associated time interval, and in the case of an electric device arranged to provide electric energy, the one or more requests results in an amount of electric energy provided by the electric device to the electricity distribution network being increased during the associated time interval.

5. A method according to claim 4, in which, in the case of an electric device arranged to consume electric energy, the one or more requests result in the electric device being disconnected from the electricity distribution network during the associated time interval, and in the case of an electric device arranged to provide electric energy, the one or more requests results in the electric device being connected to the electricity distribution network during the associated time interval.

6. A method according to claim 1, in which the one or more selected electric devices comprises an electric energy generator, and the one or more requests result in an increase in electric energy generation by the electric energy generator.

7. A method according to claim 1, in which the associated one or more time intervals are arranged such that the group whose net energy consumption is reduced is varied sequentially throughout the time period.

8. A method according to claim 1, in which the profile information for a given said electric device comprises information relating to an availability for control of the given electric device, and the given said electric device is allocated to one of the plurality of groups on the basis of whether the given electric device is available for control during a given said time interval.

9. A method according to claim 1, in which the profile information comprises energy recovery information relating to an energy recovery property of at least some of the electric devices, and the selection of a plurality of groups is performed on the basis of the energy recovery information.

10. A method according to claim 9, in which the energy recovery property relates to an extent to which an electric device recovers energy and/or the time it takes to recover energy.

11. A method according to claim 10, wherein the electric device recovers heat energy.

12. A method according to claim 10, in which the electric device provides energy to the network by discharging an energy storage device and/or recovers energy by recharging the energy storage device.

13. A method according to claim 1, in which the profile information comprises ownership information relating to at least some of the electric devices, and the selection of a plurality of groups is performed on the basis of the ownership information.

14. A method according to claim 1, in which the profile information comprises operating characteristic information relating to at least some of the electric devices, and the selection of a plurality of groups is performed on the basis of the operating characteristic information.

15. A method according to claim 1, in which the profile information comprises information relating to the device type of at least some of the electric devices, and the selection of a plurality of groups is performed on the basis of the device type information.

16. A method according to claim 1, in which the profile information includes an indication of whether a given electric device is arranged to consume electric energy or whether the given electric device is arranged to provide electric energy.

17. A method according to claim 1, in which the profile information comprises energy amount indicators indicating an amount of energy consumption and/or provision associated with the electric devices, and the method comprises:
identifying a net amount of electrical energy consumption to be reduced during the time period; and
allocating electric devices to groups on the basis of the energy amount indicators.

18. A method according to claim 1, in which the profile information comprises location indicators indicating a location of a given electrical device, and method comprises:
identifying a given area in which electrical energy consumption is to be controlled; and
selecting, based on the location indicators, a plurality of the groups of the electric devices located within the given area.

19. A method according to claim 18, comprising maintaining the device database at a control node associated with the given area.

20. A method according to claim 19, comprising sending the one or more requests from the control node.

21. A method according to claim 19, in which the device database comprises device identifiers identifying electric devices located in the given area.

22. A method according to claim 21, comprising:
using the device identifiers to monitor, at the control node, electric energy consumption and/or provision patterns of the electric devices, to compile statistical information relating to electric energy consumption/provision patterns associated with the electric devices;
storing the statistical information in the device database; and
allocating electric devices to groups on the basis of the statistical information.

23. A method according to claim 21, in which the control node is arranged to communicate with a central node, the central node comprising a user database, the user database identifying a user associated with each of the electric devices.

24. A method according to claim 21, in which the device database is arranged to store further identifiers, different to the device identifiers, the further identifiers each identifying a corresponding electric device, the user database comprising the further identifiers.

25. A method according to claim 24, comprising varying the further identifier identifying a given electric device.

26. A method according to claim 1, wherein the plurality of electric devices are distributed amongst a plurality of premises.

27. A method according to claim 26, in which the each of the premises is connected to the electricity distribution network via a distribution feeder.

28. A method according to claim 26, comprising sending one or more said of the requests for receipt at electric devices via a gateway in an energy management system associated with a given said premises, the energy management system being arranged to control electrical energy consumption and/or provision by electric devices at the given premises according to defined rules for controlling devices associated with the gateway.

29. A method according to claim 28, comprising determining, at the gateway, whether to pass the requests to the electric device on the basis of a determination of whether the requests are compatible with the defined rules.

30. A method according to claim 28, further comprising buffering one or more said requests for execution at one or more predetermined times.

31. A method according to claim 28, further comprising updating the device database when one or more of the requests is not compatible with the defined rules.

32. A method according to claim 29, wherein the determination comprises interpolating and/or extrapolating the generated plurality of models to determine the one or more characteristics.

33. A method according to claim 1, in which the energy management criteria include financial data, the financial data relating to at least one of a time dependent electrical energy market value, a balancing management service and a constraint management service.

34. A control node for controlling electrical energy consumption within an electricity distribution network, the electricity distribution network supplying electrical energy to a plurality of electric devices, wherein each of the electric devices is connectable to the electricity distribution network to consume electrical energy provided therefrom, thereby increasing a net amount of electrical energy consumption, and/or to provide electrical energy to the electricity distribution network, thereby decreasing a net amount of electric energy consumption, the control node comprising:
a communications means, the communications means being for sending requests for receipt at the electric devices, and for communicating with a central node, the central node comprising a device database arranged to store profile information, relating to the electric devices;
input means arranged to receive an indication of a time period during which electrical energy consumption in electricity distribution network is to be controlled; and
processing means arranged to:
evaluate a plurality of mobles against one or more energy management criteria, wherein the plurality of modles is generated by allocating electric devices based on the profile information;
determine one or more characteristics of a preferred model based on the evaluation;
select, based on at least the determined characteristic, a plurality of groups of the electric devices, each of the groups comprising a plurality of the electric devices;
associate one or more time intervals with each of the selected groups, the one or more time intervals associated with a given selected group being different to the one or more time intervals associated with the other selected groups, each said time interval being a time interval of the time period during which net electrical energy consumption of an associated group is to be controlled; and
send one or more requests, via the communications means, for receipt at the electric devices of the selected groups, to control electrical energy consumption and/or provision by the electric devices, thereby reducing a net consumption of electrical energy, during a respective associated time interval.

35. A system for controlling electrical energy consumption within an electricity distribution network, the electricity distribution network supplying electrical energy to a plurality of electric devices, wherein each of the electric devices is connectable to the electricity distribution network to consume electrical energy provided therefrom, thereby increasing a net amount of electrical energy consumption and/or to provide electrical energy to the electricity distribution network, thereby decreasing a net amount of electric energy consumption, the system comprising:

a plurality of control nodes, wherein each of the plurality of control nodes comprise:
  a communication means, the communications means being for sending resquest for receipt at the electric devices, and for communication with a central node, the central node comprising a device database arranged to store profile information relating to the electric devices;
  input means arranged to receive an indication of a time period during which electrical energy consumption in electricity distribution network is to be controlled; and processing means arranged to:
  evaluate a plurality of models against one or more energy management criteria, wherein the plurality of models is generated by allocating electric devices based on the profile information;
  determine one or more characteristics of a preferred model based on the evaluation;
  select, based on at least the determined characteristic, a plurality of the groups of the electric devices, each of the groups comprising a plurality of the electric devices;
  associate one or more time intervals with each of the selected groups, the one or more time intervals associated with a given selected group being different to the one or more time intervals associated with the other selected groups, each said time interval being a time interval of the time period during which net electrical energy consumption of an associated group is to be controlled; and
  send one or more requsts via the communication means for receipt at the electric devices of the selected group, to control electrical energy consumption and/or provision by the electric devices, thereby reducing a net consumption of electrical energy, during a respective associated time interval; and
  wherein each of the plurality of control nodes is associated with a different area; and
a said central node.

36. A system according to claim 35, wherein the electric devices whose profile information is stored in the device database are associated with different user accounts, and the central node comprises a user interface for a said user to access a said account and to alter information stored in the device database.

* * * * *